United States Patent
Ozawa

(10) Patent No.: US 7,900,262 B2
(45) Date of Patent: Mar. 1, 2011

(54) SECURITY MANAGEMENT METHOD AND APPARATUS, AND SECURITY MANAGEMENT PROGRAM

(75) Inventor: Shuji Ozawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 763 days.

(21) Appl. No.: 11/817,397

(22) PCT Filed: Mar. 3, 2006

(86) PCT No.: PCT/JP2006/304812
§ 371 (c)(1),
(2), (4) Date: Aug. 29, 2007

(87) PCT Pub. No.: WO2006/095879
PCT Pub. Date: Sep. 14, 2006

(65) Prior Publication Data
US 2009/0222914 A1    Sep. 3, 2009

(30) Foreign Application Priority Data
Mar. 8, 2005   (JP) .............................. 2005-064560

(51) Int. Cl.
*H04L 9/00* (2006.01)
(52) U.S. Cl. .............................. 726/26; 726/27; 713/166
(58) Field of Classification Search ............. 726/17–21, 726/26–30; 713/164–168, 176, 193–194
See application file for complete search history.

(56) References Cited

U.S. PATENT DOCUMENTS

| | | | |
|---|---|---|---|
| 6,446,209 B2 * | 9/2002 | Kern et al. | 713/193 |
| 6,931,530 B2 * | 8/2005 | Pham et al. | 713/165 |
| 2003/0061166 A1 | 3/2003 | Saito et al. | 705/54 |
| 2004/0103202 A1 | 5/2004 | Hildebrand et al. | 709/229 |
| 2004/0187022 A1 | 9/2004 | Asada et al. | 713/200 |

FOREIGN PATENT DOCUMENTS

| | | |
|---|---|---|
| EP | 1320014 A2 | 6/2003 |
| JP | 2002-366314 A | 12/2002 |
| JP | 2003-099400 A | 4/2003 |
| JP | 2003-228520 A | 8/2003 |
| JP | 2004-157874 A | 6/2004 |
| JP | 2004-234241 A | 8/2004 |

* cited by examiner

*Primary Examiner* — Hosuk Song
(74) *Attorney, Agent, or Firm* — Fitzpatrick, Cella, Harper & Scinto

(57) ABSTRACT

According to the present invention, a security management program which is recorded in a computer readable recording medium and is used to control access to target data in accordance with a security level of a device and an access right of a user, comprises a code of a user authentication step of setting the access right of the user with reference to a saved user authentication history when access to an authentication server cannot be made; and a code of a security level setting step of determining a security level of the device in accordance with a state of the device, and saving the determined security level.

8 Claims, 39 Drawing Sheets

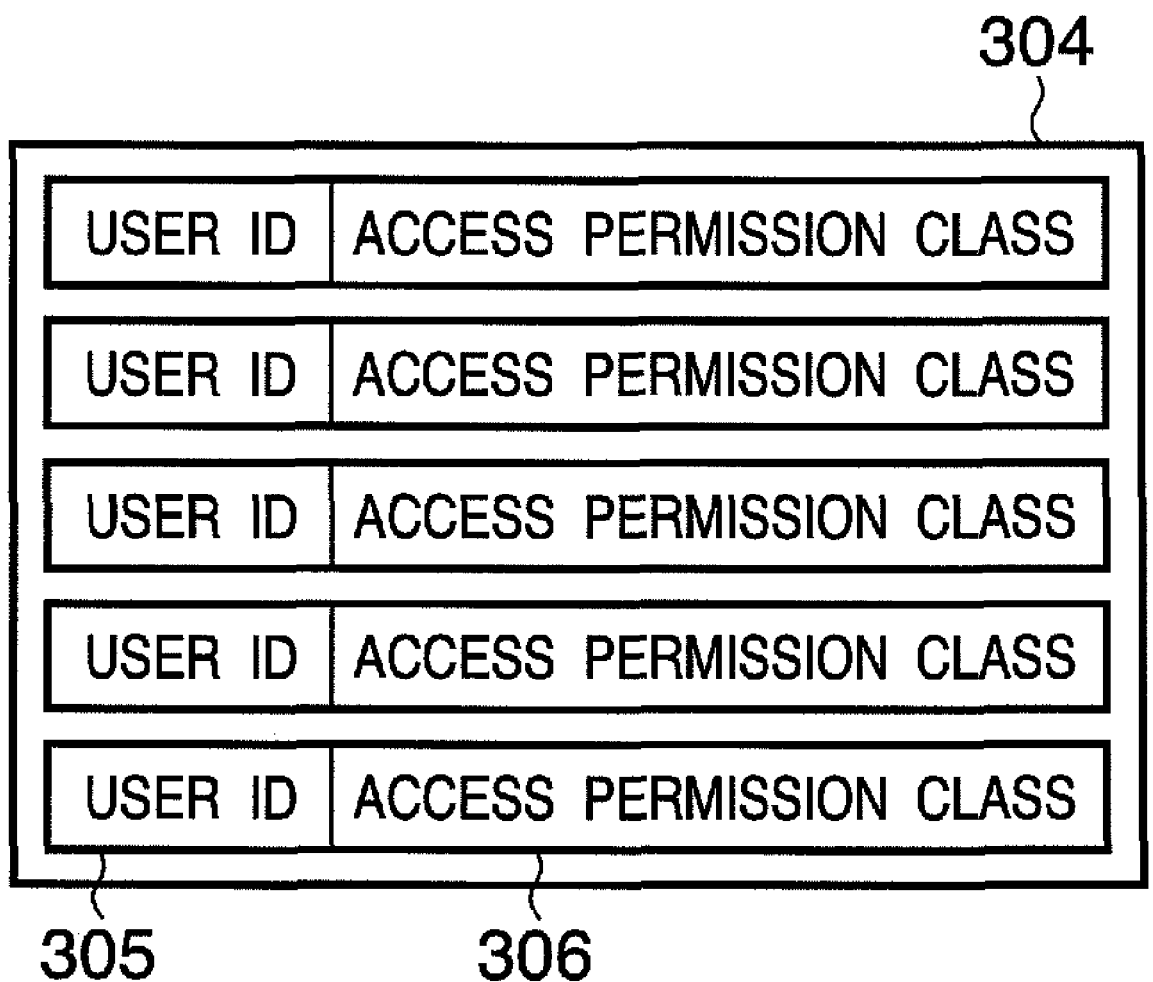

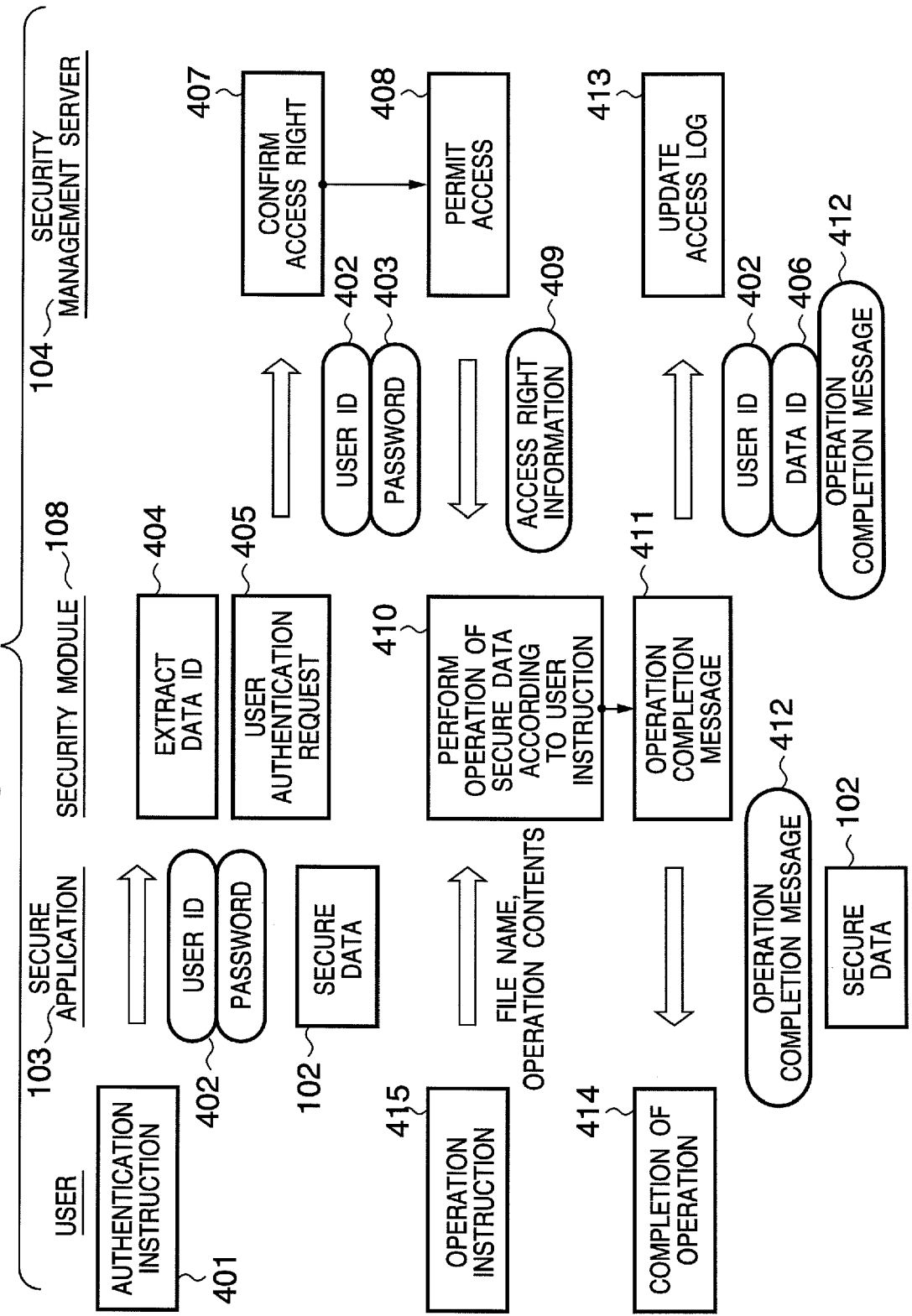

DETERMINATION OF SECURITY LEVEL

FIG. 5B

| FACTOR | DEDUCTED/ADDED POINT CONTENTS | | |
|---|---|---|---|
| USER AUTHENTICATION | APPROVAL ACCESS RIGHT USE SECURITY PROCESSING TABLE FOR USER WITH APPROVAL RIGHT | EDITORIAL ACCESS RIGHT USE SECURITY PROCESSING TABLE FOR USER WITH EDITORIAL RIGHT | INSPECTION ACCESS RIGHT USE SECURITY PROCESSING TABLE FOR USER WITH INSPECTION RIGHT |
| ACCESS TO SECURITY MANAGEMENT SERVER | NO POINTS ARE DEDUCTED IN CASE OF "OK" | THREE POINTS ARE DEDUCTED (−3) IN CASE OF "NG" | |
| GPS | NO POINTS ARE DEDUCTED IN CASE OF "INSIDE OFFICE" AND "NOT PUBLIC SPACE" | TWO POINTS ARE DEDUCTED (−2) IN CASE OF "INSIDE OFFICE" AND "PUBLIC SPACE" | THREE POINTS ARE DEDUCTED (−3) IN CASE OF "OUTSIDE OFFICE" |
| SCHEDULER SOFTWARE AND DATABASE ON/OFF OFFICE RECORD | | | |
| INSTALLATION OF VIRUS CHECK SOFTWARE | NO POINTS ARE DEDUCTED IN CASE OF "INSTALLED" | ONE POINT IS DEDUCTED IN CASE OF "NOT INSTALLED" | |
| AUTHENTICATION USING RFID | THREE POINTS ARE ADDED (+3) IN CASE OF "RFID AUTHENTICATION" | | |

FIG. 8

FILE REGISTRATION UI

FILE NAME : C:¥SALES¥TOKYO¥MONTHLY SALES.xxx [BROWSE] ~802
DESTINATION : SECTION CHIEF A [BROWSE] ~803

☑ SEND E-MAIL ~804

─ COMMENT ─
PLEASE GIVE APPROVAL UNTIL x (MONTH) x (DAY) ~805

[REGISTRATION] [CANCEL]
   806          807

~801

UPON DESIGNATION OF "SEND E-MAIL"

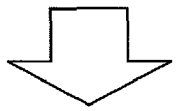

SENDER : xxxxxx
SUBJECT : APPROVAL REQUEST OF SECURITY DOCUMENT

APPROVAL REQUEST OF FOLLOWING SECURITY DOCUMENT HAS BEEN ISSUED

C:¥SALES¥TOKYO¥MONTHLY SALES.xxx

[COMMENT]

PLEASE GIVE APPROVAL UNTIL x (MONTH) x (DAY)

─

~808

E-MAIL EXAMPLE

FIG. 10B

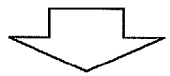

INSPECTION / EDITORIAL / PRINT SECURITY CONFIRMATION ~1001

FILE NAME: C:¥SALES¥TOKYO¥MONTHLY SALES.xxx

■ USER WITH APPROVAL RIGHT ~1002

| INSPECTION | | | EDIT | | | PRINT | | |
|---|---|---|---|---|---|---|---|---|
| 5 | NORMAL INSPECTION | ▽ | 5 | PERMITTED | ▽ | 5 | NORMAL PRINT | ▽ |
| 4 | NORMAL INSPECTION | ▽ | 4 | PERMITTED | ▽ | 4 | NORMAL PRINT | ▽ |
| 3 | NORMAL INSPECTION | ▽ | 3 | PERMITTED | ▽ | 3 | NORMAL PRINT | ▽ |
| 2 | NORMAL INSPECTION | ▽ | 2 | PERMITTED | ▽ | 2 | MASK PRIVATE / DETAILED INFORMATION | ▽ |
| 1 | NORMAL INSPECTION | ▽ | 1 | INHIBITED | ▽ | 1 | MASK PRIVATE / DETAILED INFORMATION | ▽ |

■ USER WITH EDITORIAL RIGHT ~1003

| INSPECTION | | | EDIT | | | PRINT | | |
|---|---|---|---|---|---|---|---|---|
| 5 | NORMAL INSPECTION | ▽ | 5 | PERMITTED | ▽ | 5 | NORMAL PRINT | ▽ |
| 4 | NORMAL INSPECTION | ▽ | 4 | PERMITTED | ▽ | 4 | MASK PRIVATE / DETAILED INFORMATION | ▽ |
| 3 | NORMAL INSPECTION | ▽ | 3 | INHIBITED | ▽ | 3 | MASK PRIVATE / DETAILED INFORMATION | ▽ |
| 2 | MASK PRIVATE / DETAILED INFORMATION | ▽ | 2 | INHIBITED | ▽ | 2 | MASK PRIVATE / DETAILED INFORMATION | ▽ |
| 1 | MASK PRIVATE / DETAILED INFORMATION | ▽ | 1 | INHIBITED | ▽ | 1 | INHIBITED | ▽ |

■ USER WITH INSPECTION RIGHT ~1004

| INSPECTION | | | EDIT | | | PRINT | | |
|---|---|---|---|---|---|---|---|---|
| 5 | NORMAL INSPECTION | ▽ | 5 | INHIBITED | ▽ | 5 | MASK PRIVATE / DETAILED INFORMATION | ▽ |
| 4 | MASK PRIVATE / DETAILED INFORMATION | ▽ | 4 | INHIBITED | ▽ | 4 | MASK PRIVATE / DETAILED INFORMATION | ▽ |
| 3 | MASK PRIVATE / DETAILED INFORMATION | ▽ | 3 | INHIBITED | ▽ | 3 | INHIBITED | ▽ |
| 2 | MASK PRIVATE / DETAILED INFORMATION | ▽ | 2 | INHIBITED | ▽ | 2 | INHIBITED | ▽ |
| 1 | INHIBITED | ▽ | 1 | INHIBITED | ▽ | 1 | INHIBITED | ▽ |

| CHANGE | OK | CANCEL |
|---|---|---|
| 1105 | 1106 | 1107 |

FIG. 11

PROCESSING LIMITATION CHANGE UI ~1101

FILE NAME: C:¥SALES¥TOKYO¥MONTHLY SALES.xxx  [BROWSE]

■ USER WITH APPROVAL RIGHT

| INSPECTION | | EDIT | | PRINT | |
|---|---|---|---|---|---|
| 5 | NORMAL INSPECTION ▽ | 5 | PERMITTED ▽ | 5 | NORMAL PRINT ▽ |
| 4 | NORMAL INSPECTION ▽ | 4 | PERMITTED ▽ | 4 | NORMAL PRINT ▽ |
| 3 | NORMAL INSPECTION ▽ | 3 | PERMITTED ▽ | 3 | NORMAL PRINT ▽ |
| 2 | NORMAL INSPECTION ▽ | 2 | PERMITTED ▽ | 2 | MASK PRIVATE / DETAILED INFORMATION ▽ |
| 1 | NORMAL INSPECTION ▽ | 1 | INHIBITED ▽ | 1 | MASK PRIVATE / DETAILED INFORMATION ▽ |

■ USER WITH EDITORIAL RIGHT

| INSPECTION | | EDIT | | PRINT | |
|---|---|---|---|---|---|
| 5 | NORMAL INSPECTION ▽ | 5 | PERMITTED ▽ | 5 | NORMAL PRINT ▽ |
| 4 | NORMAL INSPECTION ▽ | 4 | PERMITTED ▽ | 4 | NORMAL PRINT ▽ |
| 3 | NORMAL INSPECTION ▽ | 3 | PERMITTED ▽ | 3 | NORMAL PRINT ▽ |
| 2 | NORMAL INSPECTION ▽ | 2 | PERMITTED ▽ | 2 | MASK PRIVATE / DETAILED INFORMATION ▽ |
| 1 | NORMAL INSPECTION ▽ | 1 | INHIBITED ▽ | 1 | MASK PRIVATE / DETAILED INFORMATION ▽ |

■ USER WITH INSPECTION RIGHT

| INSPECTION | | EDIT | | PRINT | |
|---|---|---|---|---|---|
| 5 | NORMAL INSPECTION ▽ | 5 | PERMITTED ▽ | 5 | NORMAL PRINT ▽ |
| 4 | NORMAL INSPECTION ▽ | 4 | PERMITTED ▽ | 4 | NORMAL PRINT ▽ |
| 3 | NORMAL INSPECTION ▽ | 3 | PERMITTED ▽ | 3 | NORMAL PRINT ▽ |
| 2 | NORMAL INSPECTION ▽ | 2 | PERMITTED ▽ | 2 | MASK PRIVATE / DETAILED INFORMATION ▽ |
| 1 | NORMAL INSPECTION ▽ | 1 | INHIBITED ▽ | 1 | MASK PRIVATE / DETAILED INFORMATION ▽ |
| | MASK PRIVATE / DETAILED INFORMATION | | | | |
| | PRINT INHIBITED | | | | |

~1102, ~1103, 1104~ [CHANGE]   1105 [CANCEL]

FIG. 12B

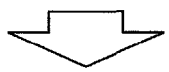

TEMPLATE REGISTRATION UI — 1203

TEMPLATE: [LEVEL 2 ▽] — 1204

■ USER WITH APPROVAL RIGHT

INSPECTION
| 5 | NORMAL INSPECTION ▽ |
| 4 | NORMAL INSPECTION ▽ |
| 3 | NORMAL INSPECTION ▽ |
| 2 | NORMAL INSPECTION ▽ |
| 1 | NORMAL INSPECTION ▽ |

EDIT
| 5 | PERMITTED ▽ |
| 4 | PERMITTED ▽ |
| 3 | PERMITTED ▽ |
| 2 | PERMITTED ▽ |
| 1 | INHIBITED ▽ |

PRINT
| 5 | NORMAL PRINT ▽ |
| 4 | NORMAL PRINT ▽ |
| 3 | NORMAL PRINT ▽ |
| 2 | MASK PRIVATE / DETAILED INFORMATION ▽ |
| 1 | MASK PRIVATE / DETAILED INFORMATION ▽ |

■ USER WITH EDITORIAL RIGHT

INSPECTION
| 5 | NORMAL INSPECTION ▽ |
| 4 | NORMAL INSPECTION ▽ |
| 3 | NORMAL INSPECTION ▽ |
| 2 | NORMAL INSPECTION ▽ |
| 1 | NORMAL INSPECTION ▽ |

EDIT
| 5 | PERMITTED ▽ |
| 4 | PERMITTED ▽ |
| 3 | PERMITTED ▽ |
| 2 | PERMITTED ▽ |
| 1 | INHIBITED ▽ |

PRINT
| 5 | NORMAL PRINT ▽ |
| 4 | NORMAL PRINT ▽ |
| 3 | NORMAL PRINT ▽ |
| 2 | MASK PRIVATE / DETAILED INFORMATION ▽ |
| 1 | MASK PRIVATE / DETAILED INFORMATION ▽ |

■ USER WITH INSPECTION RIGHT

INSPECTION
| 5 | NORMAL INSPECTION ▽ |
| 4 | NORMAL INSPECTION ▽ |
| 3 | NORMAL INSPECTION ▽ |
| 2 | NORMAL INSPECTION ▽ |
| 1 | NORMAL INSPECTION ▽ |

Dropdown expanded:
- MASK PRIVATE / DETAILED INFORMATION
- PRINT INHIBITED

— 1205

EDIT
| 5 | PERMITTED ▽ |
| 4 | PERMITTED ▽ |
| 3 | PERMITTED ▽ |
| 2 | PERMITTED ▽ |
| 1 | INHIBITED ▽ |

PRINT
| 5 | NORMAL PRINT ▽ |
| 4 | NORMAL PRINT ▽ |
| 3 | NORMAL PRINT ▽ |
| 2 | MASK PRIVATE / DETAILED INFORMATION ▽ |
| 1 | MASK PRIVATE / DETAILED INFORMATION ▽ |

1206 — [REGISTRATION]  [CANCEL] — 1207

FILE ACQUISITION UI

YOUR RIGHT : USER WITH INSPECTION RIGHT — 1302

FILE NAME : C:¥SALES¥TOKYO¥MONTHLY SALES.xxx — 1303

1304

| INSPECTION | | | EDIT | | | PRINT | | |
|---|---|---|---|---|---|---|---|---|
| 5 | NORMAL INSPECTION | ▽ | 5 | INHIBITED | ▽ | 5 | MASK PRIVATE /DETAILED INFORMATION | ▽ |
| 4 | MASK PRIVATE /DETAILED INFORMATION | ▽ | 4 | INHIBITED | ▽ | 4 | MASK PRIVATE /DETAILED INFORMATION | ▽ |
| 3 | MASK PRIVATE /DETAILED INFORMATION | ▽ | 3 | INHIBITED | ▽ | 3 | INHIBITED | ▽ |
| 2 | MASK PRIVATE /DETAILED INFORMATION | ▽ | 2 | INHIBITED | ▽ | 2 | INHIBITED | ▽ |
| 1 | INHIBITED | ▽ | 1 | INHIBITED | ▽ | 1 | INHIBITED | ▽ |

SELECTION — 1305    CANCEL — 1306

1307

SAVE DESTINATION DESIGNATION UI

YOUR RIGHT : USER WITH INSPECTION RIGHT

FILE NAME : C:¥SALES¥TOKYO¥MONTHLY SALES.xxx

SAVE DESTINATION : C:¥SALES¥TOKYO¥MONTHLY SALES.xxx — 1308

OK — 1309    CANCEL — 1320

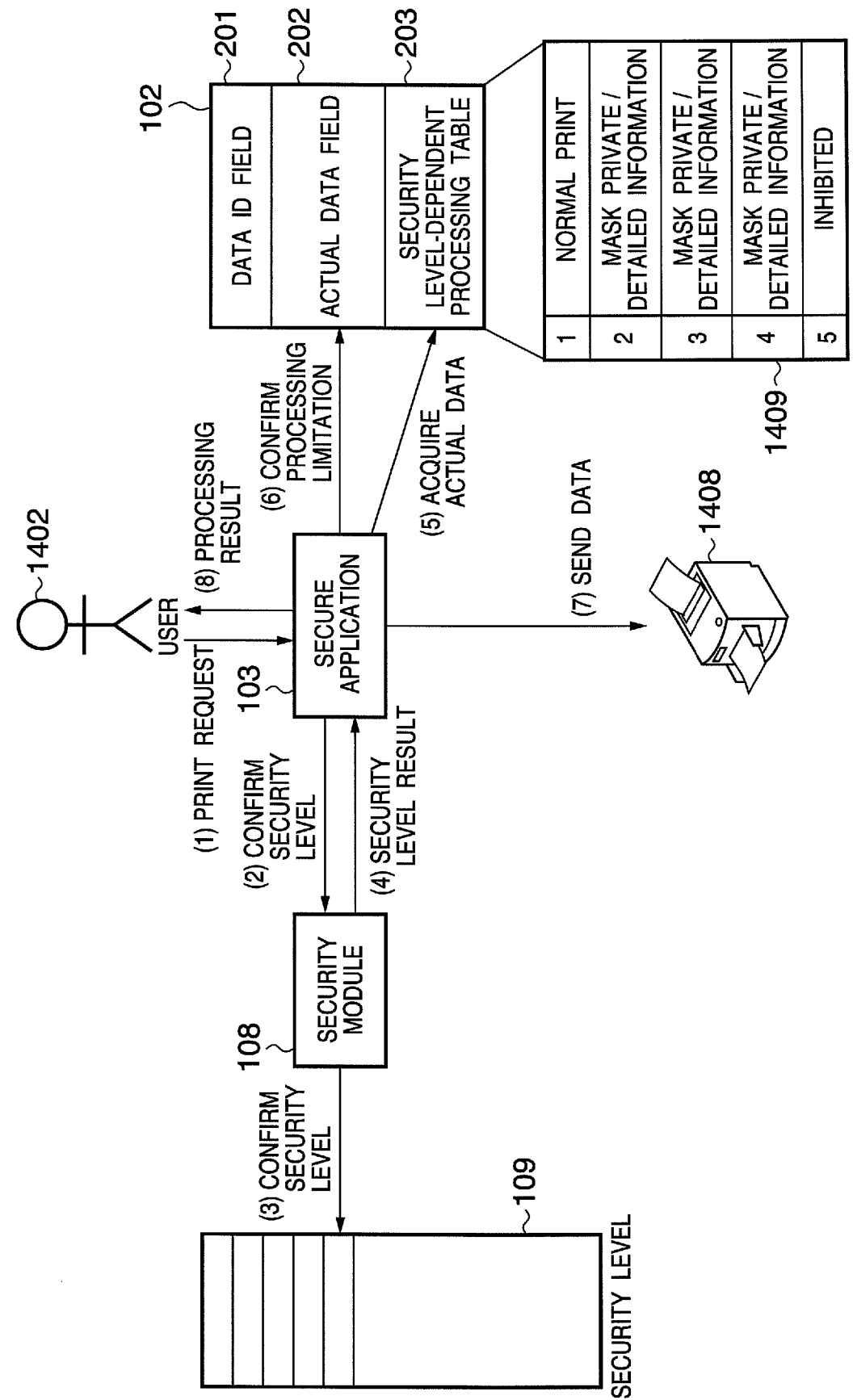

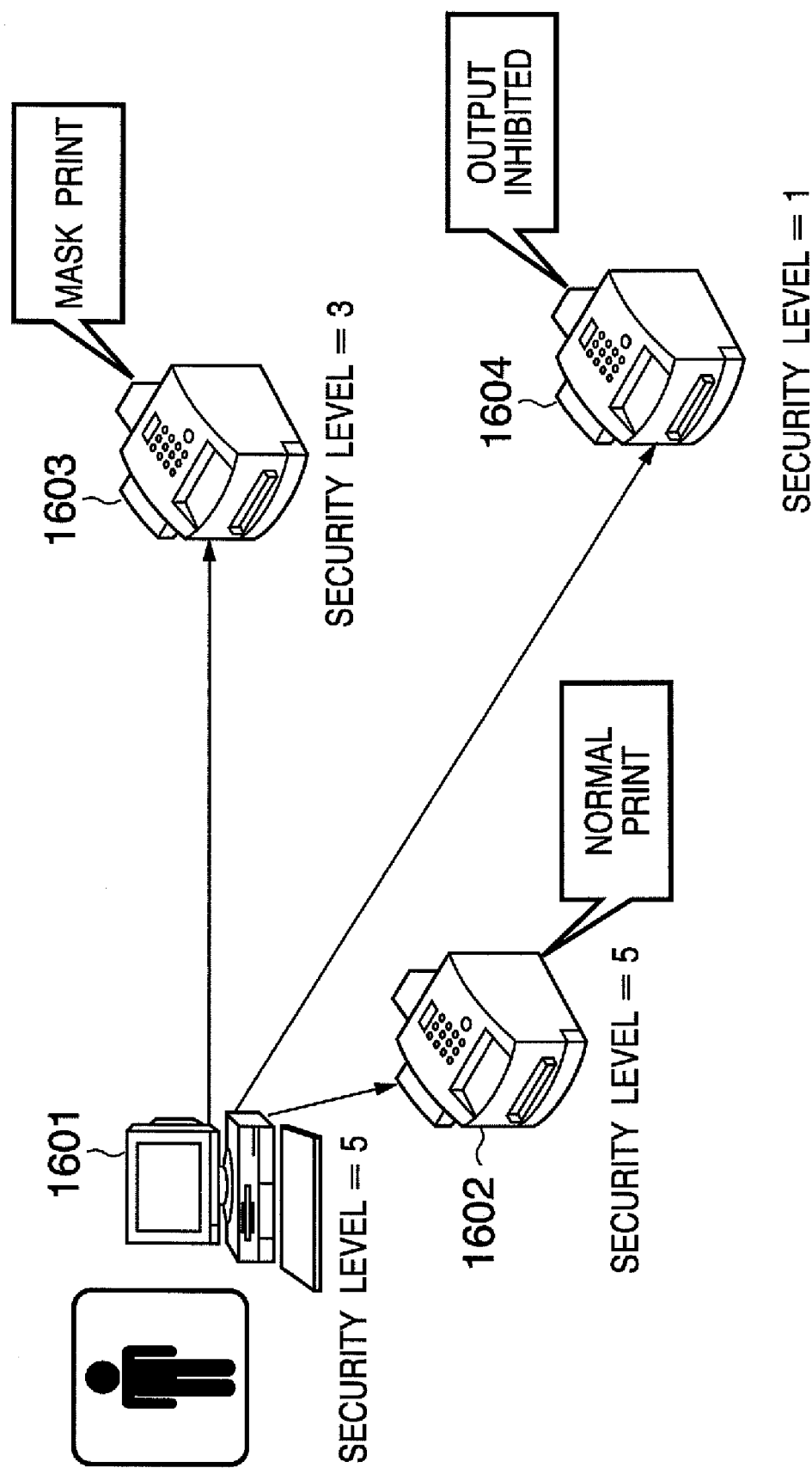

FIG. 18B

OUTPUT DESTINATION DESIGNATION UI — 1804

YOUR RIGHT : USER WITH INSPECTION RIGHT

FILE NAME : C:¥SALES¥TOKYO¥MONTHLY SALES.xxx  [SEARCH]

SECURITY LEVEL : LEVEL 3

OPERATION DESIGNATION : NORMAL PRINT ▽ — 1805

1806

| PRINTER NAME | LOCATION |
|---|---|
| A | ROOM NO. 111, 1ST FLOOR |
| B | ROOM NO. 222, 2ND FLOOR |
| C | ROOM NO. 333, 3RD FLOOR |

[OK] 1807   [CANCEL] 1808

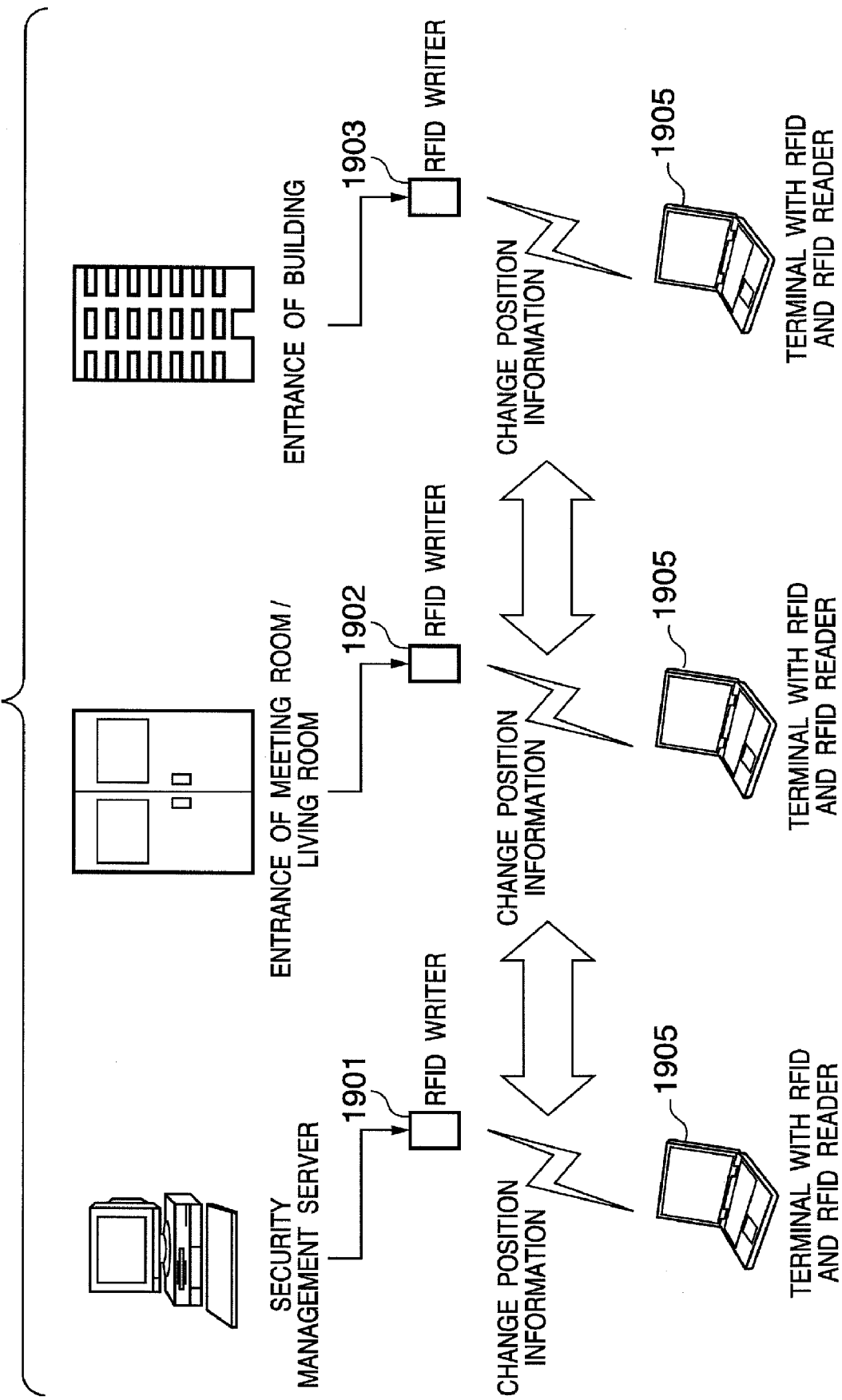

FIG. 28

| USER ID | ACCESS RIGHT | DATE AND TIME |
|---|---|---|
| A | USER WITH INSPECTION RIGHT | JANUARY 1 |
| B | USER WITH APPROVAL RIGHT | FEBRUARY 2 |
| C | USER WITH EDITORIAL RIGHT | MARCH 3 |
| D | USER WITH INSPECTION RIGHT | APRIL 4 |
| ⋮ | ⋮ | ⋮ |

SECURITY MANAGEMENT METHOD AND APPARATUS, AND SECURITY MANAGEMENT PROGRAM

TECHNICAL FIELD

The present invention relates to, e.g., a document management system and, more particularly, to a secure document system which performs integrated security management for documents handled by a personal computer, server, output device, and input device, which are connected via a network, i.e., a security management method and apparatus, and a security management program.

BACKGROUND ART

As a measure taken to prevent leak of confidential information from a computer network, a secure document system is known. The secure document system unifies management of a PC and input/output devices connected to a network, and secure data handled by them. The secure document system has a security management server that performs access right management. Upon accessing encrypted secure data by the PC or input/output device connected to the network, a main body that accesses, for example, a secure application, secure printer, or the like must be authenticated by the security management server as needed.

For this reason, in order to access encrypted secure data, the main body of access must be able to access the security management server. Even if secure data is brought outside the secure document system, since authentication of the server cannot be obtained, that secure data cannot be accessed. The security management server can unify management of all the access states and access histories of PC, application, and input/output devices which access secure data.

However, one often wants to bring secure data outside the secure document system and to use them there. As a solution, a so-called remote access method of accessing the security management server from the place the user has gone via a telephone line to acquire authentication is known (see Japanese Patent Laid-Open No. 2002-366314).

However, upon accessing the secure document system using remote access, the security management server must permit external accesses such as the telephone line and the like. Such remote access poses a problem in terms of security, i.e., protection against computer viruses, invasion, and the like.

Furthermore, for the secure document system, advanced management by means of an administrator and the like, management apparatus, management program, and the like is an option. However, an apparatus such as a personal computer and the like which tries to access the security management server is separated from the secure document system and has a low security level. For this reason, when such apparatus is granted access right or processing right of the same level as that of the apparatus which belongs to the secure document system, leak of confidential information or the like occurs, thus undermining security.

More specifically, the operability and convenience lower if security improves, and vice versa. Hence, it is difficult to meet these two conflicting requirements at the same time.

DISCLOSURE OF INVENTION

The present invention has been made in consideration of the above prior arts, and can provide convenience corresponding to the current degree of security by changing limitations on processing for secure data to be protected in accordance with the situation of an apparatus which handles the secure data. Hence, it is an object of the present invention to provide a security management method and apparatus and a security management program, which can prevent convenience from excessively diminishing so as to maintain security in a situation in which confidence is easy to hold, and can prevent convenience from increasing by undermining security in a situation in which confidence is easy to leak.

In order to achieve the above object, the present invention comprises the following arrangement.

A security management program for controlling access to target data in accordance with a security level of a device and an access right of a user, comprises:

a user authentication step of setting the access right of the user with reference to a saved user authentication history when access to an authentication server cannot be made; and a security level setting step of determining a security level of the device in accordance with a state of the device, and saving the determined security level.

Alternatively, a security management program comprises:

a security level setting step of determining a security level of a device in accordance with a state of the device, and saving the determined security level; and a control step of controlling access to target data in accordance with the security level and an access right of a user.

Alternatively, a security management apparatus comprises:

determination means for determining whether or not access to a security management server can be made;

edit means for editing secure data based on access right information from the security management server when the determination means determines that access to the security management server can be made; and output means for outputting the secure data in accordance with a state of a device when the determination means determines that access to the security management server cannot be made.

With the above arrangement, by changing limitations of processing on secure data to be protected in accordance with the situation of an apparatus which handles the secure data, convenience corresponding to the current degree of security can be provided. For this reason, the convenience can be prevented from excessively diminishing so as to maintain security in a situation in which confidence is easy to hold, or can be prevented from increasing by undermining security in a situation in which confidence is easy to leak.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

FIGS. 3A and 3B show an example of secure management data stored in a security management server of the secure document system to which the present invention is applied;

FIG. 4A is a view showing an online authentication mechanism between the security management server and a security module in the secure document system to which the present invention is applied;

FIGS. 5A and 5B are views showing the determination state of security levels of devices;

FIG. 8 shows an example of a file registration UI and an e-mail message to a user who has an "approval" access right;

FIGS. 10A and 10B show examples of a security level processing confirmation UI of a template;

FIG. 11 shows an example of a processing change UI;

FIGS. 12A and 12B show examples of a template registration UI;

FIG. 13 shows an example of a file acquisition UI;

FIG. 14 is a view showing an example of a processing limitation state in print processing based on a security level-dependent processing table appended to secure data;

FIGS. 16A and 16B are views showing an example in which security levels are assigned to secure output devices;

FIGS. 18A and 18B are views showing an example of an output to a device other than the secure output device in operation;

FIGS. 19A and 19B are views showing an example of position information recognition based on RFIDs;

FIG. 28 shows an example of a user authentication history table saved and managed by the security module.

BEST MODE FOR CARRYING OUT THE INVENTION

Definition

Prior to a description of preferred embodiments, some terms will be defined. Secure data is encrypted and protected data. A secure application is an application program which has an encryption function and decryption function of processing the secure data. A secure output device is an output device such as a printer or the like, which has a decryption function of decrypting the secure data. A secure input device is an input device such as a scanner or the like which has an encryption function of converting input data into secure data. A security module is a program module which has a user authentication request function and security level setting function described in this embodiment. The security module is used by the secure application or the like in a computer. Also, the security module is often used by the secure input and output devices. A security management server is a server which executes management of the user's access right and secure data, processing required for the management, and the like. A secure document system is a document processing system which includes a computer on which the secure application has been installed, the secure input device, the secure output device, and the secure management server, and the like, distributes document data as secure data, and executes processing such as edit, printing, and the like of the document data.

First Embodiment

An embodiment according to the present invention will be described in detail hereinafter with reference to the accompanying drawings. FIGS. 1 to 4B show an example of the arrangement of a secure document system which implements processing for limiting the processing contents for secure data in accordance with a security level according to the present invention.

<Arrangement of Secure Document System>

Figure 1:
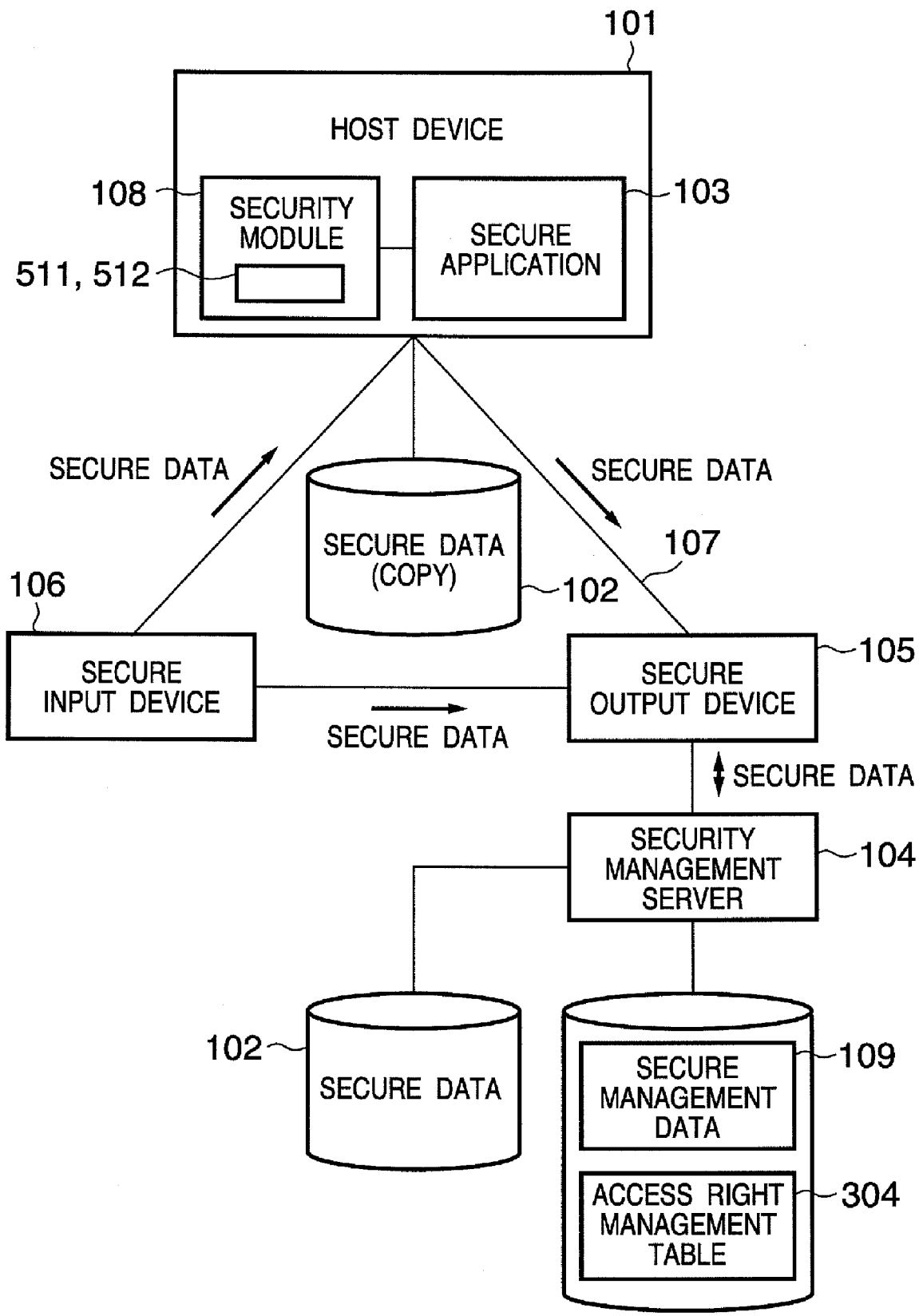
FIG. 1 is a block diagram showing an example of the arrangement of a secure document system to which the present invention is applied.

FIG. 1 shows a constituent range of a secure document system to which the present invention is applied. This system comprises at least one of a secure output device 105 which is connected to a network 107 and can access secure data 102, a secure application 103 and security module 108 installed in a host device (or host computer) 101, and a secure input device 106, and a security management server 104 connected to these devices 103, 105, and 106. Note that the connection relationship shown in FIG. 1 is an illustrative example, and a physical network has a structure such as a bus architecture, star architecture, or the like. The security management server 104 can be accessed not only by the secure output device 105 but also the secure input device 106 and host computer 101. Even when the secure management server 104 is connected to the secure input device 106 and host device 101, this server forms the secure document system to which the present invention is applied. The secure application 103 and security module 108 need not always be installed in the host device 101, and they may be installed in the secure output device 105 and secure input device 106. The secure application 103 and security module 108, the secure output device 105, and the secure input device 106 can access encrypted secure data 102 and can be authenticated by the security management server 104.

The security management server 104 saves and manages registered secure data 102, and also saves and manages secure management data 109 and an access right management table 304. The secure data 102 is read out by each of the devices on the secure document system. For example, in FIG. 1, the host device 101 reads out a copy of the secure data 102 and saves it in its storage or the like. The security module 108 monitors the security level of the device in which it is installed, and issues an operation instruction to the security management server 104. The user can perform operations and processing such as inspection, editing, printing, and the like using the secure application 103. These operations and processing are limited by a security level acquired by the security application 103 from the security module 108.

The secure application 103 and secure output device 105 have a function of decrypting the secure data. Decryption is implemented using a decryption key, which may be provided by, e.g., the security management server 104, or another key server or the like, or may be saved and managed by the host device 101 itself. The same applies to an encryption key.

<Secure Data>

Figure 2:
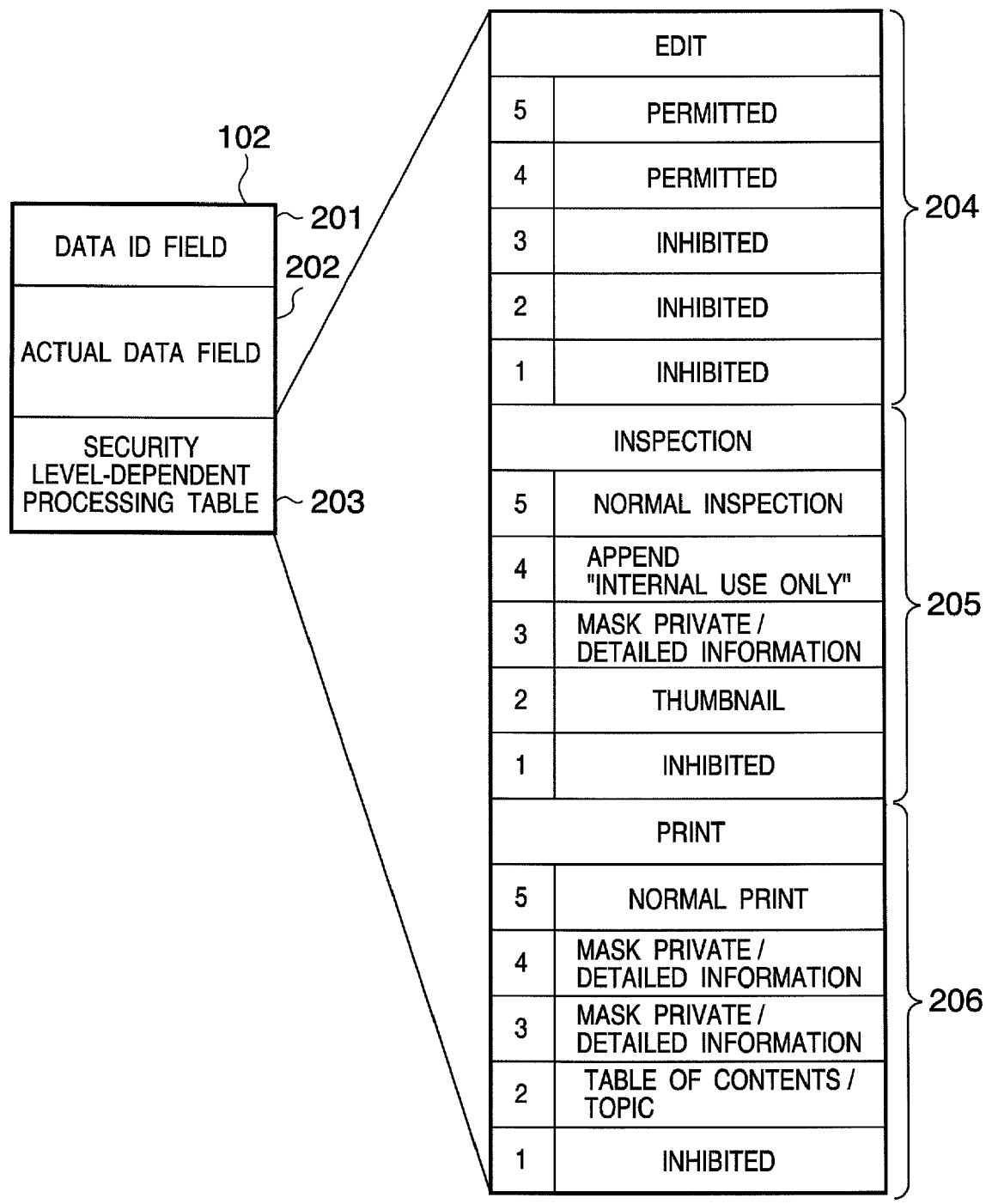
FIG. 2 shows an example of the internal structure of secure data of the secure document system to which the present invention is applied.

FIG. 2 shows an example of the internal structure of the secure data 102 of the secure document system to which the present invention is applied. The secure data 102 is encrypted, and has at least two types of fields, i.e., a data ID field 201 and real data field 202. This data ID field 201 is assigned in a unit managed by the security management server 104, and need not always have one-to-one correspondence with the file name of the secure data 102. If the file names are the same, different data IDs can be assigned. The contents of the real data field 202 may contain a document, image, video, or the like. The secure data itself 102 is encrypted. For this reason, the secure application 103 and security module 108, the secure output device 105, the secure input device 106, and the security management server 104 cannot access the real data field 202. In order to specify the secure data 102 by the data ID 201, the data ID 201 may be plaintext. In this embodiment, the secure data 102 further includes a security level-dependent processing table 203. The security level-dependent processing table 203 describes processing contents (or processing limitations or restrictions) depending on the security levels of respective devices. The security level-dependent processing table 203 includes an edit table 204, inspection table 205, and print table 206. These tables respectively register data indicating restrictions in the edit processing, those in the inspection processing, and those in the print processing in correspondence with security levels 1 to 5. In this embodiment, security level "1" is a state in which the security level of the device of interest is low, and security level "5" is a state in which the security level of the device of interest is high. Note that the security level is assigned in the sequence shown in FIG. 21 or 29. The processes of respective devices are restricted in correspondence with the security levels registered in the edit table 204, inspection table 205, and print table 206. Taking the inspection table 205 as an example, if the security level of the device of interest is currently "5", for example, the secure application installed in that device can decrypt and inspect the secure data intact. If the security level of the device of interest is currently "4", a watermark "for internal use only" is always appended upon inspection. If the security level of the device of interest is currently "3", private information and detailed information are masked and not displayed upon inspection. If the security level of the device of interest is currently "2", data is always converted into thumbnail data upon inspection. If the security level of the device of interest is currently "1", inspection is not permitted. In this way, if the security level of the device of interest is "4" or less, inspection of decrypted original data in a plain state as normal display is not allowed. Restrictions are placed in the same manner as in printing. However, restrictions different from those in the inspection processing can be set. In the example of FIG. 2, if the security level is "2", only a table of contents and topic are allowed to be printed. Note that restrictions that do not display or print a part of data can be realized by defining in advance parts to be restricted for respective restriction contents. For example, a region of "private information", that of "detailed information", those of "table of contents" and "topic", and the like can be defined in secure data which has been converted into plaintext data. More specifically, region definition information indicating each region, and region information indicating the region type of each region may be appended to secure data in correspondence with each other.

<Secure Management Data>

Figure 3A:
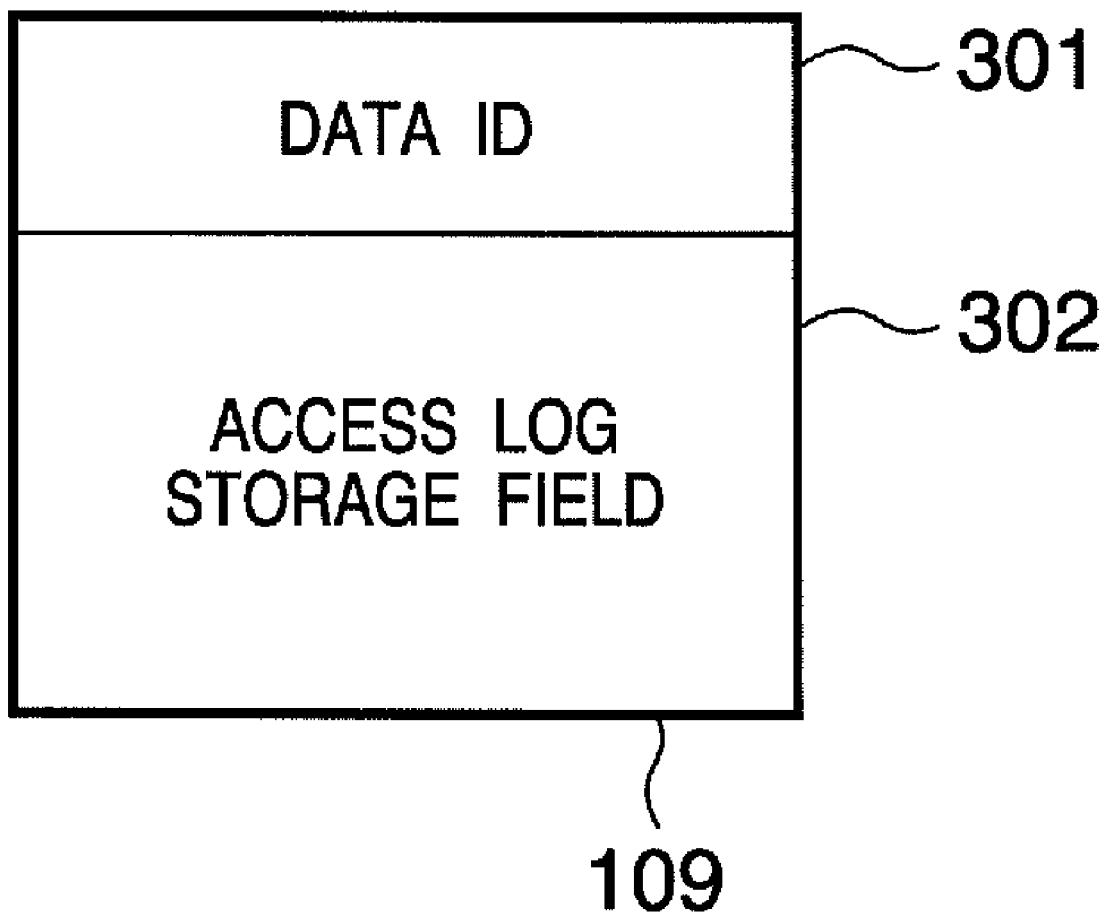

FIGS. 3A and 3B show an example of the secure management data 109 and user management data (access right management table) 304 stored in the security management server 104 of the secure document system to which the present invention is applied. The security management server 104 stores the secure management data 109 which has one-to-one correspondence with each secure data 102. The secure management data 109 basically has two types of fields, i.e., a data ID field 301 and access log storage field 302. Hence, secure management data exist as many as all secure data 102 assigned to data IDs in the secure document system. The data ID field 301 corresponds to the data ID field 201 of the secure data 102, and has the same ID as that of the associated secure data 102. An access log storage field 303 stores access states of the secure application 103 and security module 108, the secure output device 104, and the secure input device 105 to the secure data 102 as log data.

In the user management data 304, data indicating access rights are associated with user IDs. This user management data 304 registers data (access permission classes) 306 indicating the classes of access rights for respective user IDs 305. The user's access right is determined based on information in this user management data 304. Note that each access permission class 306 is information indicating permitted processing contents. For example, the access permission classes 306 include an editorial right required to edit or copy the secure data 102 (e.g., to save secure data (digital file) in a storage device connected to a PC), an inspection right required for display processing, an approval right required to approve registration of new secure data and saving after editing, and a management right for management. These rights may be exclusive but they have inclusive relations in this embodiment. The access permission classes 306 store codes according to classifications of these processes. For example, when secure data acquired by a user who has an editorial right is to be output or modified, the security level-dependent table 203 associated with that secure data is referred to. Practical processing permitted to a given user is determined, and that user is permitted to execute only the permitted processing.

Note that when user authentication is password authentication, a password corresponding to each user ID is saved, and is used to collate passwords upon authentication.

<Overview of Authentication Sequence Example>

Figure 4B:
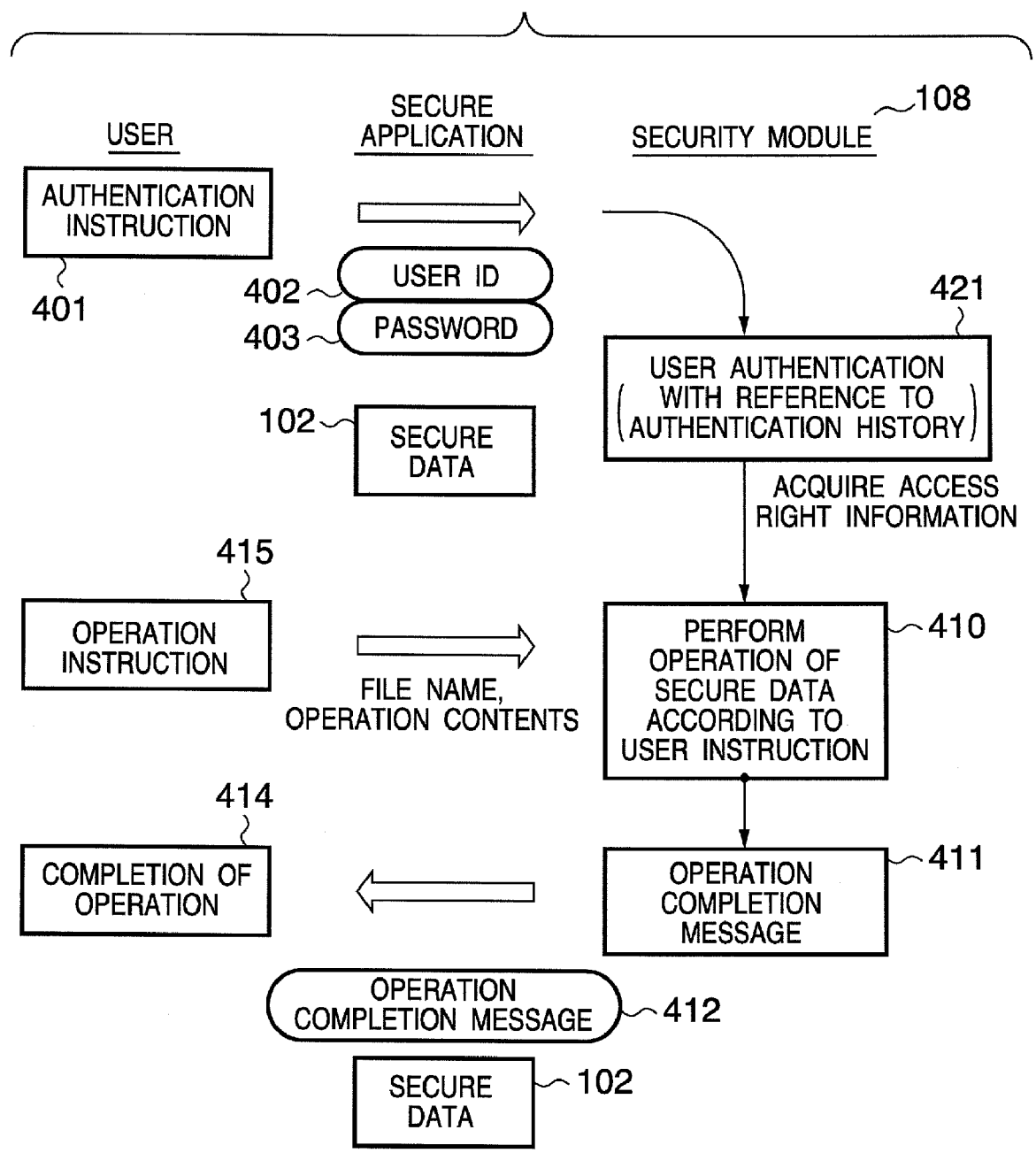
FIG. 4B is a view showing an offline authentication mechanism between the security management server and security module in the secure document system to which the present invention is applied.

FIGS. 4A and 4B show an authentication mechanism among the security management server 104, and the security application 103 and security module 108, and the secure input and output devices in the secure document system to which the present invention is applied. FIG. 4A shows a sequence when access to the security management server can be made, and FIG. 4B shows a sequence when access to the security management server cannot be made.

Figure 7:
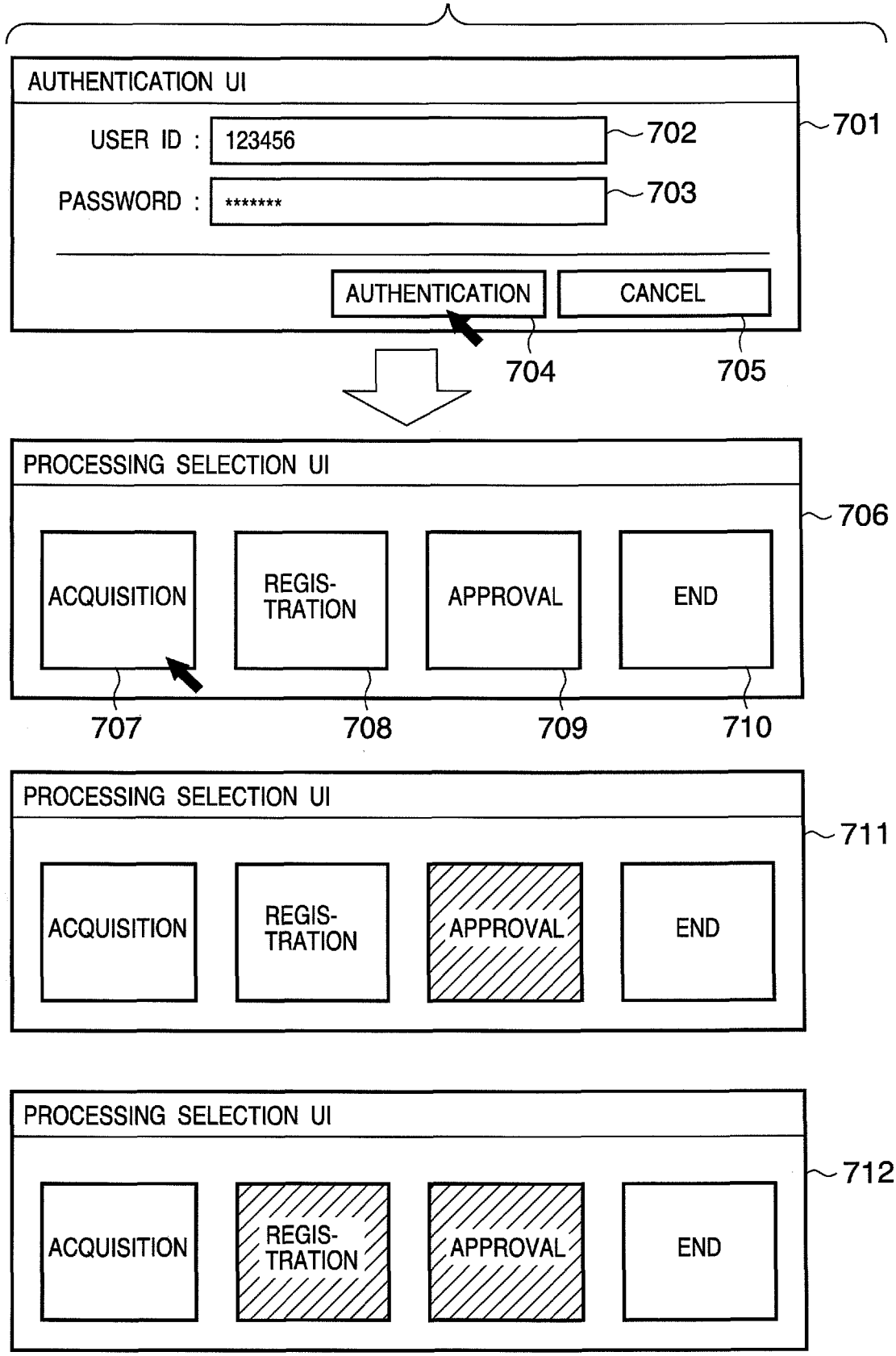
FIG. 7 shows an example of an authentication UI and operation selection UIs.

When the user wants to make an operation such as editing, printing, or the like of the encrypted secure data 102, he or she inputs an operation instruction 401 corresponding to the operation he or she wants to make to a user interface (UI) provided by the secure application 103, secure output device 105, secure input device 106, or security module 108. At this time, the user designates a user ID 302 and the secure data 102, and also designates a password 403 which specifies that user. As for items such as user authentication, selection of processing, and the like, which are independent from attributes and the like of individual data or an application or device that handles such data upon handling the secure data, inputs are made via a user interface provided by the security module 108, as shown in FIGS. 7 and 8 and the like (to be described later). Also, as for items such as an edit operation, print setting, input setting, and the like, which depend on the attributes or the like of individual data or a device or application that handles such data, inputs are made via a user interface provided by the secure application 108, secure input device 106, or secure output device 105. In FIGS. 4A and 4B, the secure application 103 is explained as a representative. However, if the secure application 103 is replaced by the secure input device 106 or secure output device 105, the following description similarly applies. FIGS. 4A and 4B will explain a case wherein the user inputs secure data recorded on a recording medium or the like to the secure document system or a case wherein new secure data is created by the secure application. When existing secure data managed by the security management server 104 is used, since the secure data 102 is saved in the security management server 104, it is never input by the user.

Referring to FIG. 4A, the secure application 103 and security module 108, which have received the user ID 402 together with the password 403 and secure data 102, extract a data ID from the data ID field 201 of the secure data 102 (404), and issue an operation authentication request 405 to the security management server 104. At this time, the user ID 402 and a password or data 403 derived from the password are passed to the security management server 104. The security management server 104 checks with reference to the user management data 304 based on these pieces of information whether not the corresponding user ID is registered. If the corresponding user ID is registered, the security management server 104 reads the access right of that user (407). If the user ID is registered, and password authentication has succeeded, authentication is successful. In this case, the security management server 104 returns an access permission 408 to the security module 108 together with the read access right (information indicating the access right) (409). The security application 103 and security module 108, the secure output device 105, or the secure input device 106, which receive or receives authentication, execute or executes an operation according to an instruction 415 from the user (410), and issue or issues an operation completion message (411). This operation completion message is sent to both the user and security management server 104. By issuing the user ID 402, a data ID 406, and an operation completion message 412 to the security management server 104, the access log in the access log storage field 302 of the secure management data 109 stored in the security management server 104 is updated (413). By issuing the secure data 102 that has undergone the operation to the user together with the operation completion message 412, the operation instructed by the user is completed (414).

On the other hand, when access to the security management server 104 cannot be made, the sequence in FIG. 4B is executed. The security module 108 which receives the user ID 402 and password 403 performs user authentication with reference to pre-stored authentication history information (421). The authentication history information saves at least a pair of user ID and access right information. After the access right information is acquired, the subsequent sequence is the same as that in FIG. 4A.

FIG. 28 shows an example of authentication history information 2800. The authentication history information includes a user ID 2801, granted access right 2802, and authentication date and time 2803. If password authentication is made, the information includes a password.

<Security Level>

Figure 5A:
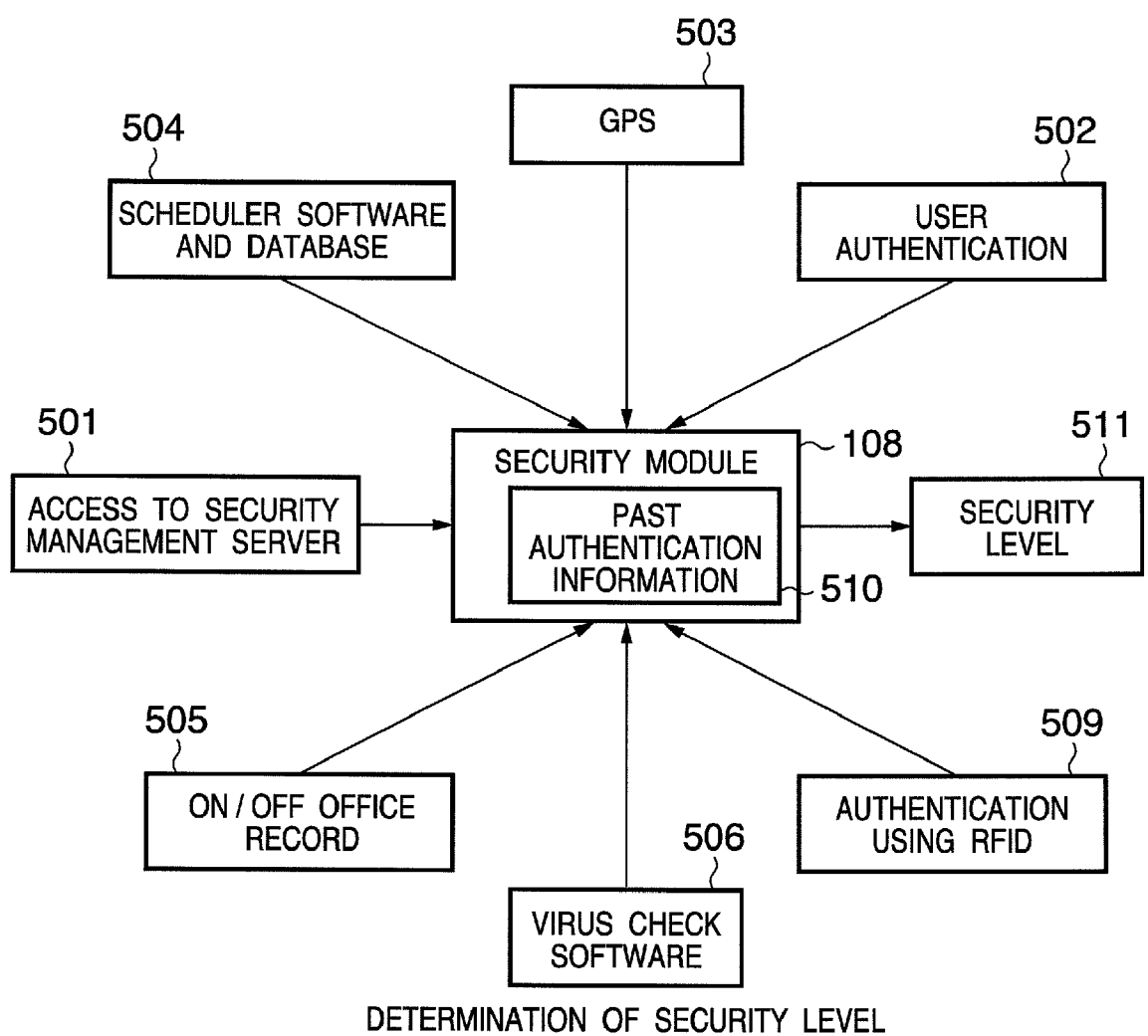

Security level determination states of respective devices will be described below using FIGS. 5A and 5B. In this embodiment, a security level is not permanently assigned, but it is determined by the security module 108 depending on the situation of the device (i.e., information which is input to that device and indicates status). An example of information indicating the status of the device includes:

(1) information indicating whether or not the security module 108 that resides in each device can access the security management server 104 (501);

(2) the type of access right in user authentication (502);

(3) the current position information of each device acquired from a GPS 503, scheduler software or a database 504, or an on/off office record 505;

(4) information indicating whether or not virus check software 506 is installed in each device; and (5) RFID authentication 509 (to be described later in the fifth embodiment).

The above pieces of information are used as decision factors of security level. When access to the security management server 104 cannot be made, user authentication cannot be executed. In this case, user authentication is executed using past authentication information 510. In this embodiment, when neither authentication by the security management server nor authentication based on the past authentication information (the same as authentication history information) are performed, it is impossible to access secure data. By setting an operation which lowers the security level when authentication has failed, the security level is used when authentication has failed, and access to secure data can be implemented while maintaining high security.

The security module 108 holds a deducted/added point contents table 512 (FIG. 5B). The deducted/added point contents table 512 describes how to increase or decrease the security level depending on the states of decision factors 501 to 510 of the security level. The security module 108 increases or decreases the security level by comparing the states obtained from the decision factors 501 to 510 with the deducted/added point contents table 512. Also, a plurality of deducted/added point contents tables 512 may be held in correspondence with access rights granted to the users, and the deducted/added point contents table may be switched in accordance with the access right. Or given points may be deducted according to the access right. In this embodiment, the latter processing is done.

Figure 6:
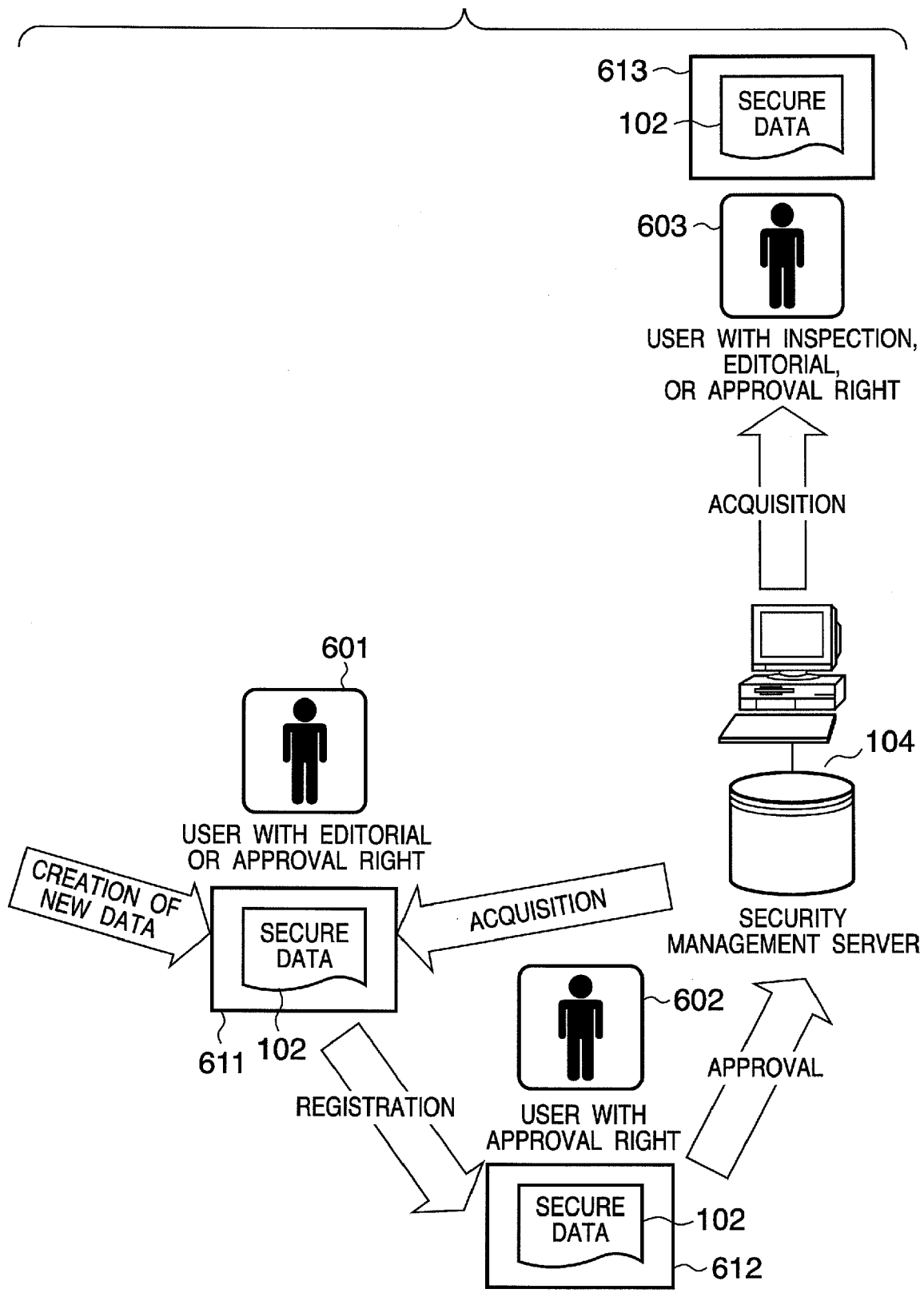
FIG. 6 is a chart showing an example of a document workflow suited to an embodiment of the present invention.

FIG. 6 shows an example of a secure document workflow to which the present invention can be suitably applied. In the present invention, a user who has an approval access right can make approval, registration, secure data acquisition, and print processing. A user who has an editorial access right can make registration, secure data acquisition, and print processing. Furthermore, a user who has an inspection access right can make only secure data acquisition and print processing. Also, a management right to manage the security management server 104 exists as another access right.

A user 601 who has an editorial or approval access right generates secure data 102 at a device 611. The user 601 who has the editorial or approval access right registers the generated secure data 102 using a device 612, and a user 602 who has an approval access right makes approval processing of that data. Only after these processes, the secure data 102 is managed by the security management server 104. A user 603 who has any of instruction, editorial, and approval access rights can inspect and print the secure data 102 managed by the security management server 104 by performing file acquisition processing using a device 613. Of course, the devices 611, 612, and 613 may be a single device. The secure data 102 which has been acquired and edited by the user 601 who has the editorial or approval access right must undergo the approval processing again by the user 602 who has approval access right.

Figure 21:
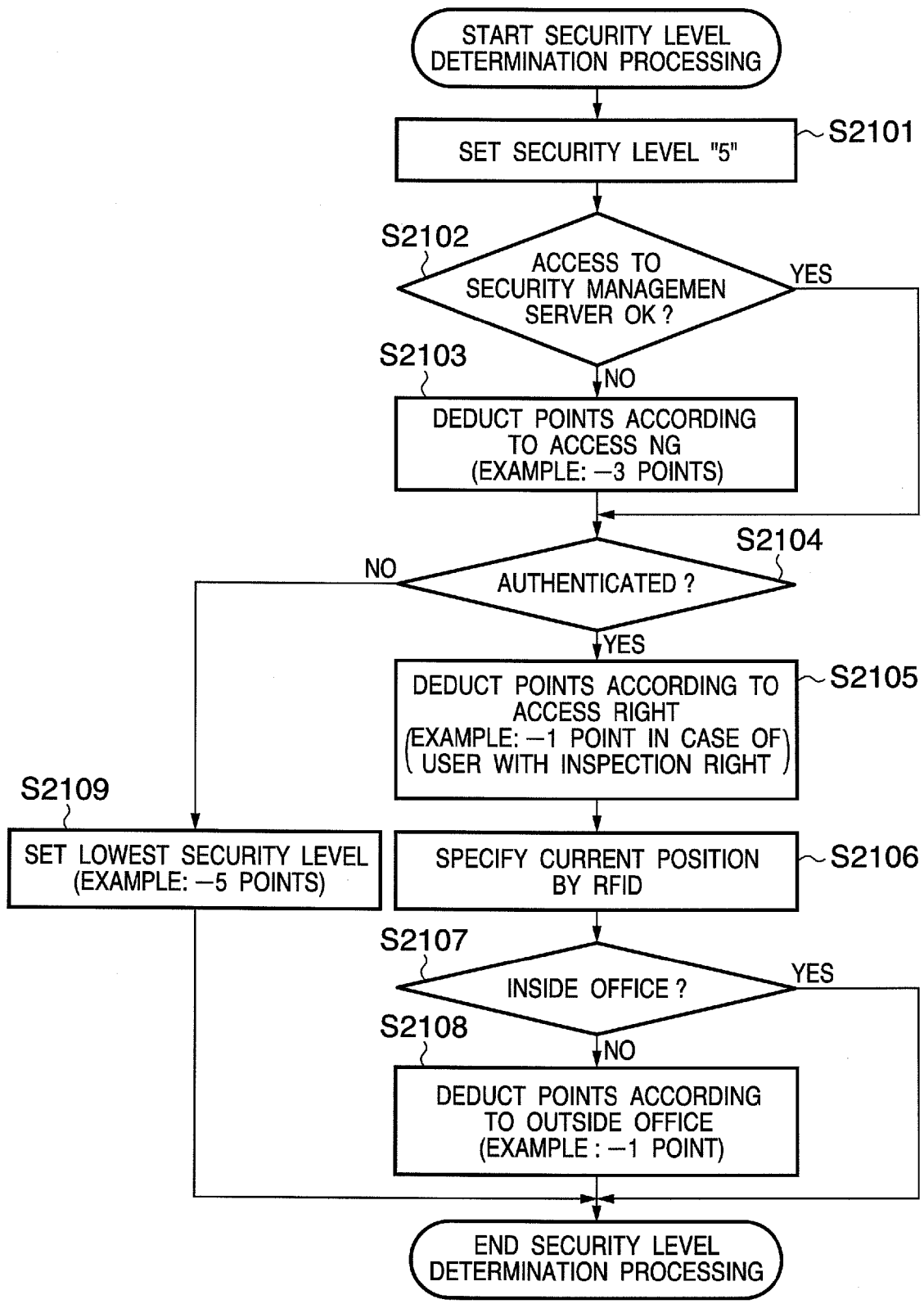
FIG. 21 is a flowchart showing an example of a user authentication sequence by a security module.

FIG. 21 is a flowchart showing an example of the security level determination sequence by the security module 108 in this embodiment. The sequence shown in FIG. 21 may be executed by an interrupt in response to an event that changes the security level or may be executed periodically. Put differently, the security level must be maintained in correspondence with the latest state.

The security level is stored at a predetermined location of a storage unit in a device on which the security module runs. At that storage location, "5" is stored as the security level (S2101). It is then checked if access to the security management server 104 is currently made (S2102). If access cannot be made, a given value (e.g., 3) is deducted from the security level (S2103). It is checked with reference to a user authentication flag if user authentication has succeeded (S2104). The user authentication flag is set to indicate the fact that user authentication by the security management server 104 has succeeded in a sequence shown in FIG. 22 or the like (to be described later). If authentication has succeeded, the security level is decreased in accordance with the type of authentication, i.e., the obtained access right. For example, if the access right is "inspection", a predetermined value (e.g., 1) is deducted from the security level (S2105). Furthermore, the current position is obtained based on the scheduler, GPS, or on/off office record (S2106), and it is checked if that position falls within a predetermined range (e.g., in the office) (S2107). If the current position falls outside the predetermined range, a predetermined value (e.g., 1) is deducted from the security level accordingly (S2108). On the other hand, if it is determined with reference to the authentication flag that authentication has failed, a lowest value is given as the security level (S2109).

Note that the current position of the device is given by that measured by the GPS if the GPS is mounted on the device. If the scheduler is installed in the device, whether or not the device falls within the predetermined range can be determined based on a description of a destination or the like in that scheduler. The on/off office record can be recorded using an RFID tag like in the fifth embodiment.

<User Authentication Processing Sequence>

The state of an operation of the user in the secure document workflow shown in FIG. 6 and the state of appending the security level-dependent processing table 203 to secure data will be described below using FIGS. 7 to 13 showing user interfaces displayed by the security module 108. FIG. 7 shows a user interface displayed by the security module 108 to be authenticated by the security management server 104.

When the secure application 103 or the like is launched, the secure module 108 called by that application displays that user interface.

The user inputs a user ID 702 and password 703 to an authentication UI 1701 and presses an authentication button 704. In response to this operation, the security module 108 communicates with the security management server 104 to perform an authentication operation. Also, the security server 108 saves the user ID 702, the password 703, and the user's access right granted by the security management server 104 to have the authentication result as past authentication history information. When the security module 108 cannot be connected to the security management server 104, it performs authentication according to the past authentication history information. In this case, the security level decreases. If the user wants to cancel authentication, he or she can press a cancel button 705.

When authentication by the security management server 104 has succeeded, a processing selection window 706 is displayed. From the processing selection window, processing buttons of "file acquisition" 707, "registration" 708, "approval" 709, and "end" 710 can be selected. The operation of the user who has an editorial or inspection access right is limited. For this reason, processing buttons that cannot be executed are grayed out. Since the user who has an editorial access right cannot execute approval processing, the button used to select the approval processing is grayed out (711). Since the user who has an inspection access right cannot execute two types of processing, i.e., registration processing and approval processing, the buttons used to select them are grayed out (712). The "end" button 710 is used to notify the security management server 104 of the end of authentication, and to clear the processing selection UI 706 from the screen.

Figure 22:
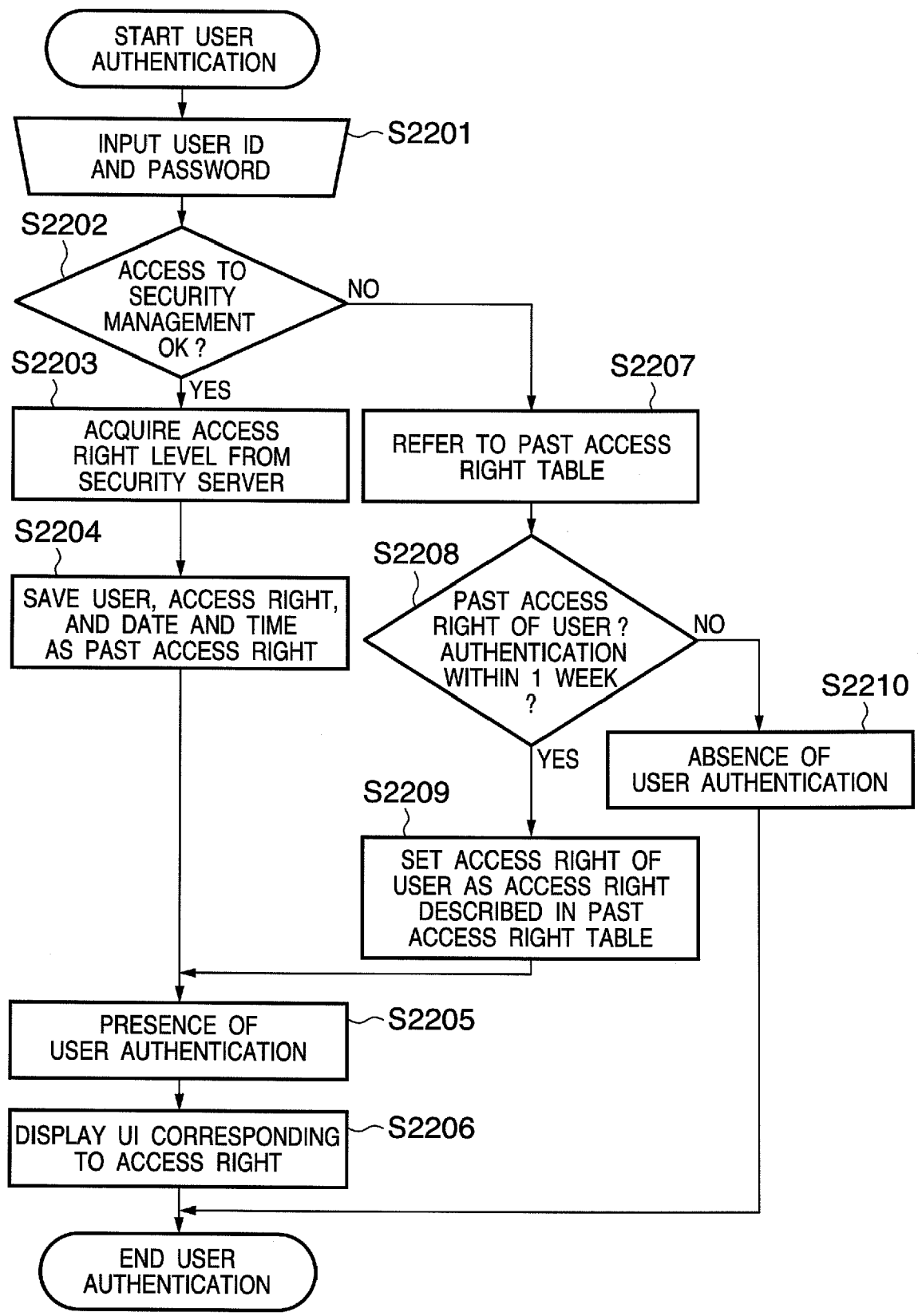
FIG. 22 is a flowchart showing an example of a file registration sequence by the security module.

FIG. 22 is a flowchart showing an example of the user authentication sequence by the security module 108 installed in the computer. When the user inputs his or her user ID and password on the user interface (S2201), the security module 108 checks if access to the security management server 104 can be made (S2202). For example, if the security module 108 attempts to issue a user authentication request to the security management server 104 and if no response returns, it determines that access cannot be made; otherwise, it determines that access can be made. If access can be made, the security module 108 receives an access right level (access right information) according to the user ID from the security management server 104 (S2203). The security module 108 saves that access right information as the access right of the user of interest. Also, the security module 108 appends the user ID, password, access right information, and authentication date and time to authentication history information 510, and saves that information in a local storage device of that device, i.e., in a removal storage medium such as a flash memory or the like (S2204). In addition, the security module 108 records using, e.g., the user authentication flag or the like, that user authentication has been made (S2205). Finally, the security module 108 displays a user interface corresponding to the acquired access right, as shown in FIG. 7 (S2206). On the other hand, if access to the security management server 104 cannot be made, the security module 108 refers to a past access right table, i.e., authentication history information 510 (S2207). The security module 108 checks based on the input user ID and password if user authentication has been done within a predetermined period of time (e.g., one week) in the past (S2208). If user authentication has been done in association with the input user ID within the predetermined period of time in the past, the security module 108 reads the corresponding access right from the authentication history information 510 and saves it as the access right of the user of interest (S2209).

When the access right of that user is to be referred to, the access right information saved in step S2203 or S2209 is referred to. On the other hand, if it is determined in step S2208 that no authentication has been done, the security module 108 records using, e.g., the aforementioned user authentication flag or the like that user authentication has failed (S2210).

<Example of File Registration Sequence>

FIG. 8 shows a file registration UI window 801 displayed by the security module 108 upon pressing of the registration processing button 708 in FIG. 7. The user describes generated secure data in a file name field 802, and designates a user who has an approval access right in a destination field 803. When the user wants to send an e-mail message to the destination, he or she checks a check box 804 of the file registration UI window 801. The user describes a special instruction and the like in a comment field 805. No description is required if there is no comment. Upon pressing of a registration button 806, the approval processing is entrusted to the user who has the approval access right. At this time, the secure data is temporarily saved in the security management server 104. If the user wants to cancel registration, he or she can press a cancel button 807. When the user checks the check box 804 to send an e-mail message, an e-mail message example 808 is sent to the user who has the approval access right designated in the destination field 803. The e-mail message describes the file name 802, comment 805, and the like.

Figure 23:
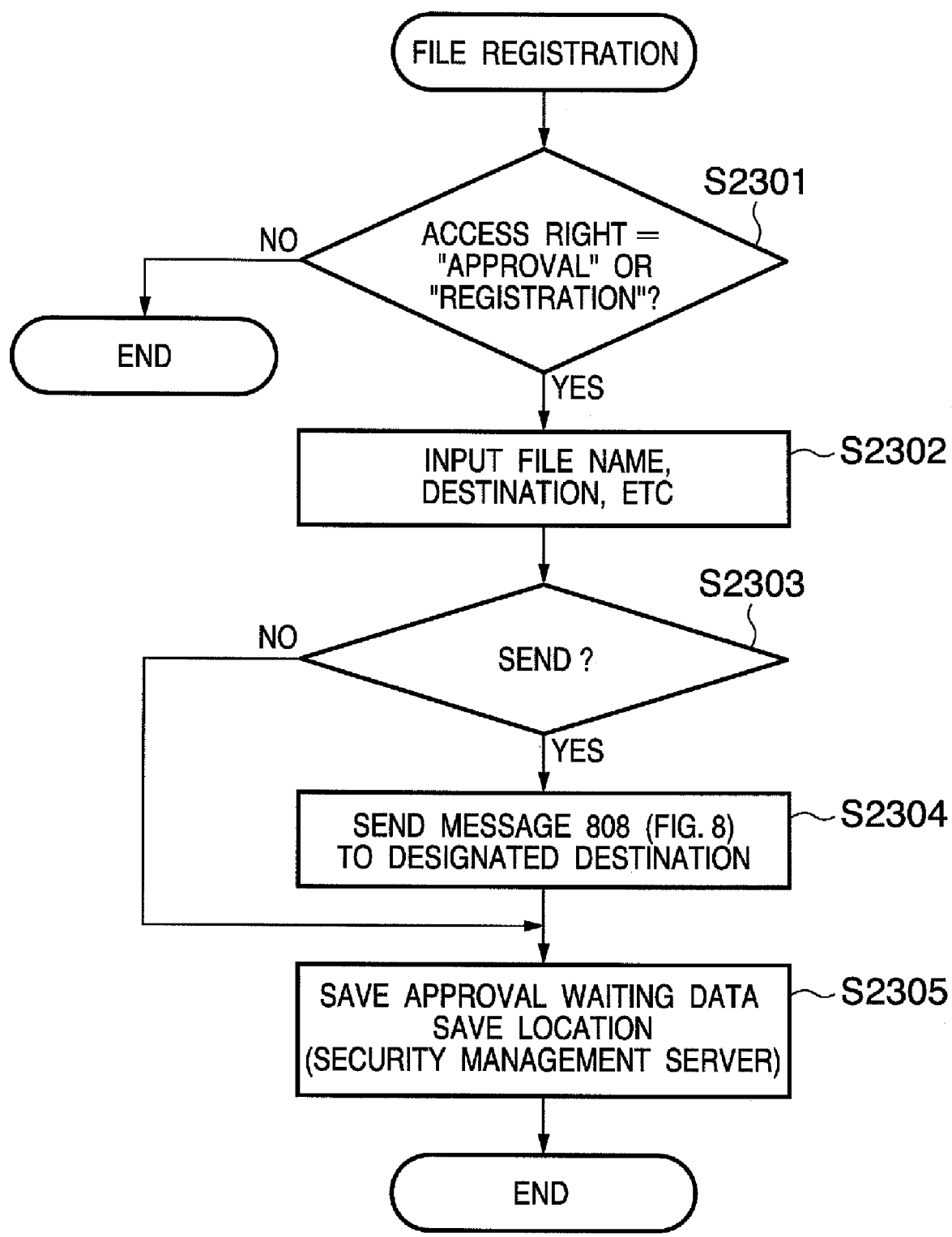
FIG. 23 is a flowchart showing an example of a file registration sequence by the security module.

FIG. 23 is a flowchart showing an example of the flow of the file registration sequence by the security module 108. Upon pressing of the registration button 708 on the window 712 or the like in FIG. 7, the access right of the user is checked. If the access right of the user is other than "approval" or "registration", it is determined that no right should be granted, and the processing ends (S2301). If the operation buttons corresponding to no rights are grayed out, as shown in FIG. 7, step S2301 is not always required. If the access right is "approval" or "editorial", the security module 108 displays the UI window shown in FIG. 8, and waits for input of a file name, destination, designation of sending of e-mail, and the like (S2302). If the required data are input, the security module 108 checks the designation of sending of e-mail with reference to the saved input data (S2303). If sending of e-mail is designated, the security module 108 sends a message 808 to the designated destination via e-mail (S2304). Finally, the security module 108 passes the approval waiting data to the security management server 104 to temporarily save it (S2305). Note that registration and approval are executed by the security management server 104 in this embodiment.

<Example of File Approval Sequence>

Figure 9:
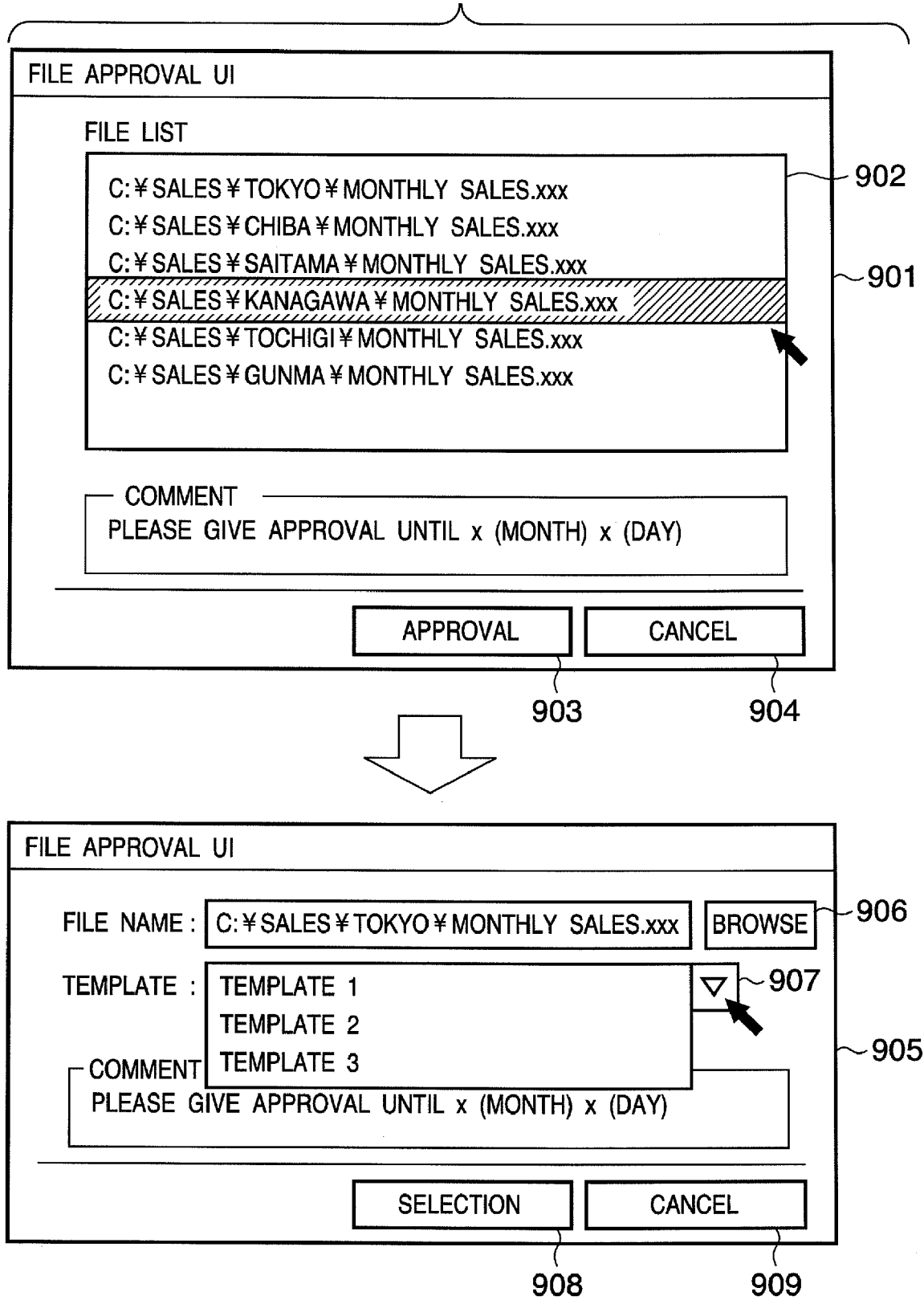
FIG. 9 shows an example of a file approval UI and security level-dependent processing table template selection UI.
Figure 24:
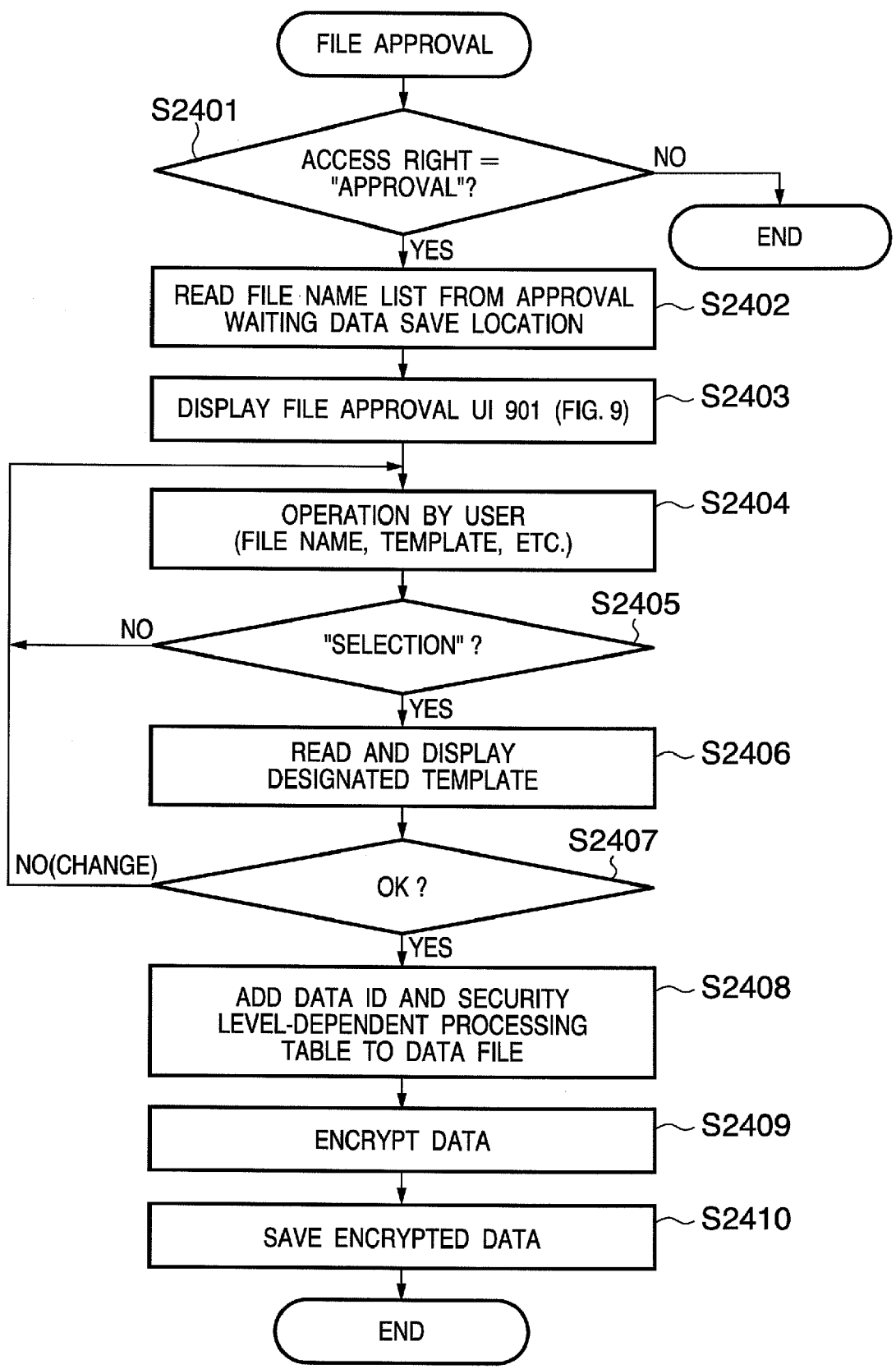
FIG. 24 is a flowchart showing an example of a file approval sequence by the security module.

FIG. 9 shows a file approval UI window 901 displayed by the security module 108 upon pressing of the approval processing button 709 in FIG. 7. FIG. 24 is a flowchart showing the approval processing sequence. Upon pressing of the approval processing button 709, the security module 108 checks if the access right is "approval" (S2401). If the access right is "approval", the security module 108 communicates with the security management server 104 to receive a list 902 of temporarily registered secure data, which are to undergo approval processing of the user who has been authenticated to have the approval access right, from the security management server 104 (S2402), and displays the received list (S2403). The user who has been authenticated to have the approval access right selects secure data to be approved from the list 902, and presses an approval button 903. If that user wants to cancel approval processing, he or she presses a cancel button 904. When the user presses the approval button 903, a template selection UI 905 is displayed. When the user presses an inspection button 906, he or she can inspect the contents of the secure data 102. The user who has been authenticated to have the approval access right selects an appropriate template from a template field 907 while confirming the contents. After the user selects a given template, he or she determines that template by pressing a selection button 908. When the user wants to cancel template selection and to return to the file approval UI 901, he or she presses a cancel button 909. The templates are registered in the security management server 104, and the security module 108 can acquire them via a communication.

Each template corresponds to the security level-dependent processing table 203 which is defined in advance. Since it is troublesome for the user to finely set security level-dependent processing tables 203 for respective secure data 102, some examples of security level-dependent processing tables 203 are saved on the security management server. By selecting a desired security level-dependent processing table 203, the user can add the security level-dependent processing table 203 to each secure data.

Figure 10A:
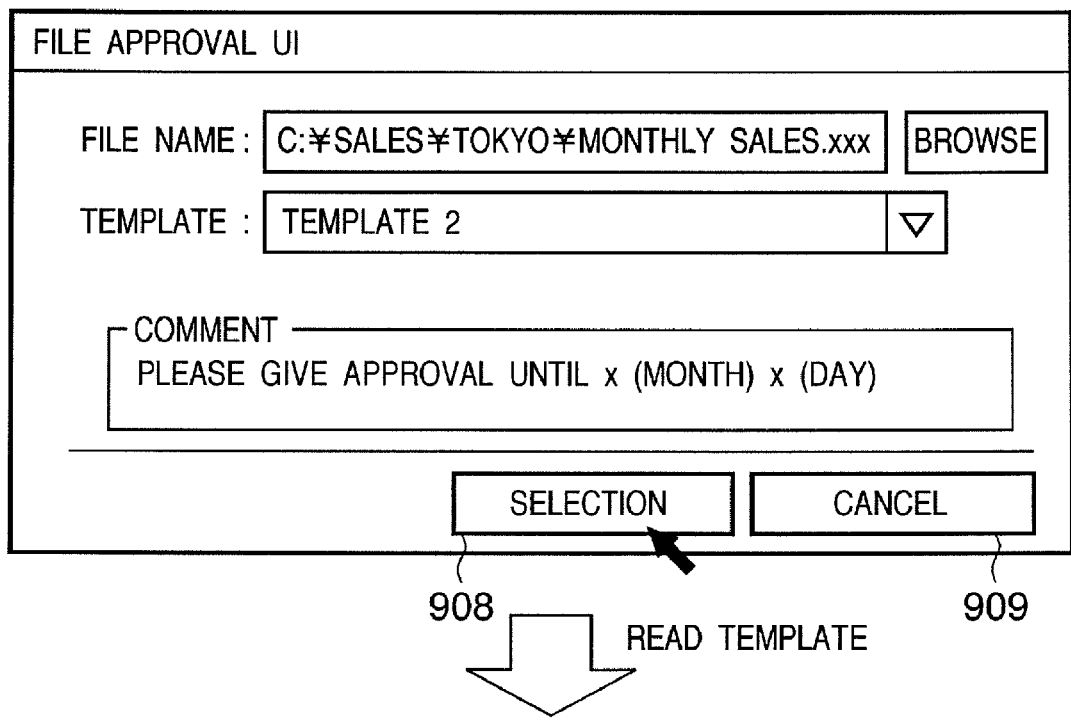

FIGS. 10A and 10B show examples of a template. The user selects one of templates on the template selection UI 905, and presses the selection button 908 (S2404). Upon pressing of the selection button (S2405—YES), the selected template is loaded, and a security level processing confirmation UI 1001 is displayed (S2406). In this step, processing limitations 1002, 1003, and 1004 are displayed for the respective access rights and security levels registered in the template. In this embodiment, processing limitations for respective security levels can be set in correspondence with the access rights, and the processing limitations 1002 for the user who has been authenticated to have the approval access right, the processing limitations 1003 for the user who has been authenticated to have the editorial access right, and the processing limitations 1004 for the user who has been authenticated to have the inspection access right are described.

If the user agrees with the displayed processing limitations, he or she presses an OK button 1006. With this operation, all the approval processing steps are complete, the processing limitations displayed on the security level processing confirmation UI 1001 are added as the security level-dependent processing table 203 to the secure data 102, and the secure data 102 is saved by the security management server 104 (S2408 to S2410). By pressing a cancel button 1007, the security level-dependent processing table template selection UI 905 can be returned.

If the user wants to change some of the processing limitations defined on the selected template, he or she presses a change button 1005. In response to this operation, a processing limitation change UI 1101 shown in FIG. 11 is displayed. By pressing a button 1102 beside each processing limitation, candidates 1103 are displayed, and the user selects a desired candidate 1103. If the user wants to reflect the changed contents, he or she presses a change button 1103; otherwise, he or she presses a cancel button 1104, thus returning to the security level processing confirmation UI 1001.

Furthermore, the security management server 104 has a registration function of registering templates of security level-dependent processing tables. When the user has been authenticated to have a "management" access right" on the authentication UI 701, a management processing selection UI 1201 is displayed. Upon pressing of a template registration button 1202, a template registration UI 1203 is displayed. The user selects a template via a field 1204, and arbitrarily changes processing limitations using corresponding buttons 1205. Upon pressing of a registration button 1206, the contents displayed on the template registration UI 1203 are registered as a template in the security management server 104. If the user wants to cancel registration, he or she can press a cancel button 1207.

<File Acquisition Processing>

Figure 25:
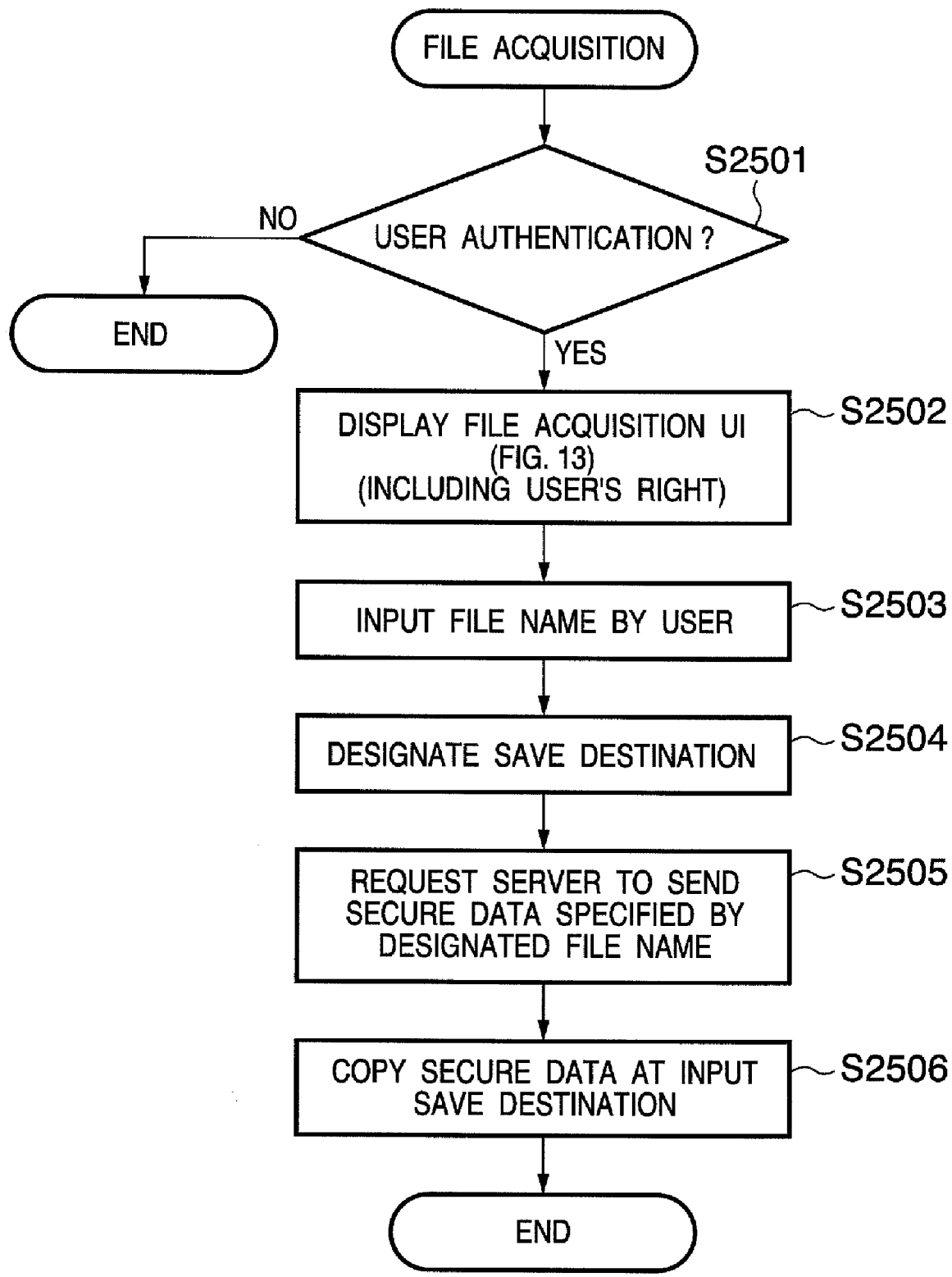
FIG. 25 is a flowchart showing an example of a file acquisition sequence by the security module.

FIG. 13 shows a file acquisition UI 1301 displayed by the security module 108 upon pressing of the file acquisition processing button 707 in FIG. 7. FIG. 25 is a flowchart of the file acquisition processing sequence by the security module 108. Upon pressing of the file acquisition processing button 707, the security module 108 checks the presence/absence of the access right, i.e., it checks with reference to the user authentication flag or the like if user authentication has been done (S2501). This is because file acquisition is permitted to users of every access rights. If the user has been authenticated, the access right is displayed in a UI field 1302 (S2502). If the user selects secure data 102 to be acquired in a file selection field 1303, the security module 108 determines and displays processing limitations to be imposed in accordance with security levels based on the access right in the UI field 1302 and the security level-dependent processing table 203 in the security data. The secure data is displayed as a file name, but it is specified by the corresponding data ID. If the user confirms the processing limitations, and agrees with the selected file, he or she presses a selection button 1305. If the user wants to cancel acquisition, he or she presses a cancel button 1306. Upon pressing of the selection button 1305, a save destination designation UI 1307 is displayed. When the user enters a save destination in each device in a save destination field 1308 and presses an OK button 1309 (S2504), the secure data 102 is copied from the security management server 104 to the host device 101, secure input device 106, or secure output device 106 (S2505, S2506). The secure data 102 copied to each device can be inspected or edited by the secure application 103.

The flow of imposing a limitation on each processing according to the security level will be explained below using FIG. 14 taking print processing as an example. A user 1402 instructs the secure application 103 to print secure data 102 which is being inspected. The secure application 103 requests a security level 109 determined by the security module 108. The security module 108 reads the security level, and returns the current security level to the secure application 103. The secure application 103 reads out table entries determined by the current security level and the current access right of the user with reference to the security level-dependent processing table 203. The readout entries include processing limitation information that specify limitations on respective processes. That information is saved as the current processing limitation information in a memory of the device on which the secure application 103 is running.

For example, with reference to the security level-dependent processing table shown in FIG. 10B, sub-tables 1002, 1003, and 1004 are included. Therefore, one sub-table can be specified based on the access right. For example, if the access right is "editorial" and the security level is "5", processing limitation information "normal inspection" is registered in the "inspection" processing, processing limitation information "permitted" is registered in the "edit" processing, and processing limitation information "normal print" is registered in the "print" processing. These pieces of information are read out from the security level-dependent processing table. Note that each processing limitation information is registered using a code that the computer can identify.

After the current processing limitations are specified and saved, actual data 202 is acquired from the secure data 102, and undergoes processing according to the print limitations. Then, the processed secure data is transferred to a printer 1408. The secure application 103 notifies the user of the processing result, and ends the processing.

For example, when the security level is "3" and a security level-dependent processing table 1409 associated with the printing processing is given, the secure application 103 masks a part where private information and detailed information of actual data are described, and then sends the secure data to the printer 1408.

Figure 26:
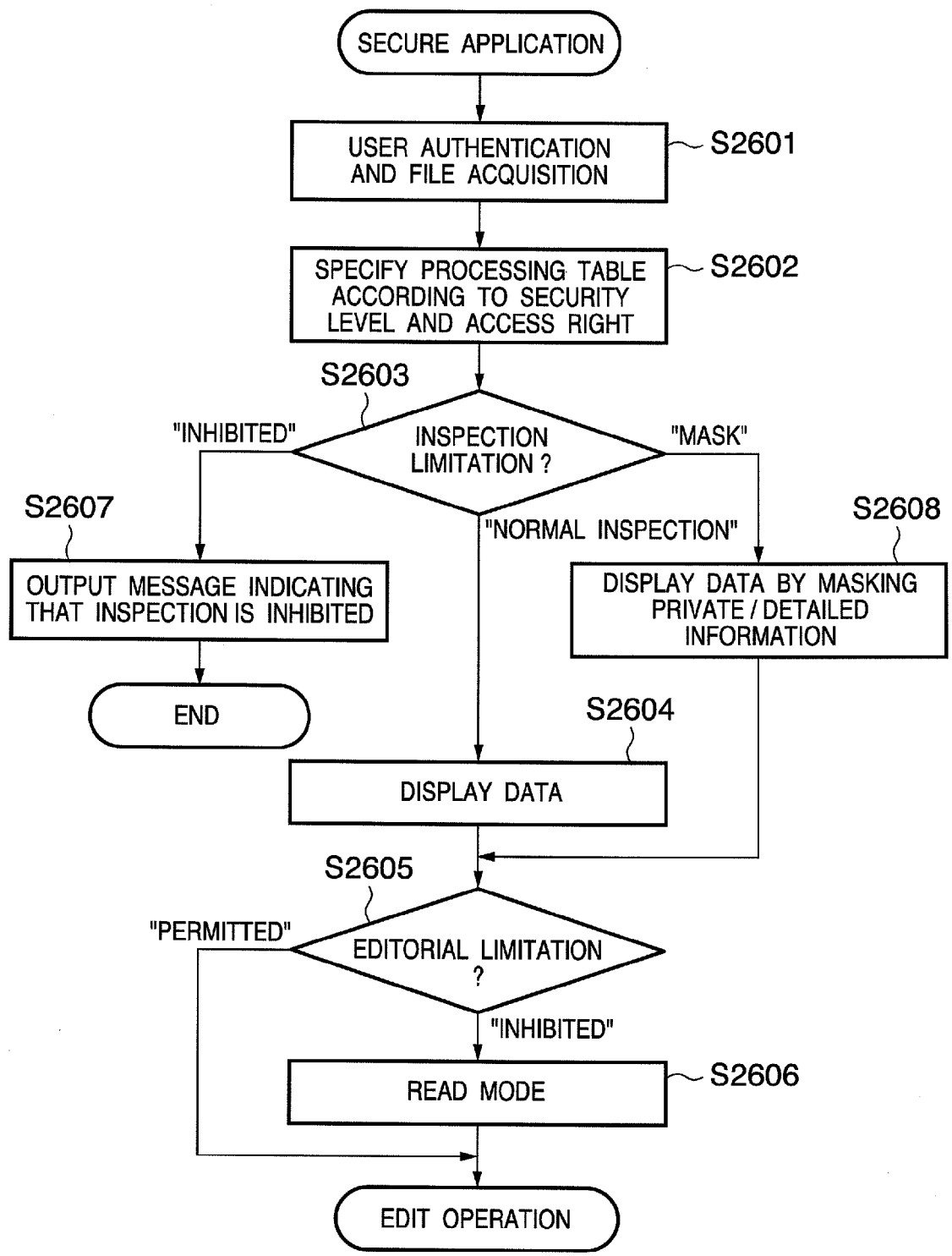
FIG. 26 is a flowchart showing an example of a secure data open processing sequence by a secure application.

FIG. 26 is a flowchart showing an example of the edit processing sequence of secure data by the secure application 103. User authentication and secure data file acquisition are made in the same manner as described above (S2601). If a copy of secure data has already been saved in the device on which the secure applications runs, it need not be acquired from the secure management server 104, and the already acquired file is used. The security level is acquired from the security module, and entries of the security level-dependent processing table are specified in accordance with that security level and access right and are read and saved from the secure data (S2602). Of the saved entries, processing limitation information for the inspection processing is referred to (S2603). If the limitation is "inhibited", a message indicating that inspection is inhibited is output (S2607). If the limitation is "normal inspection", secure data is decrypted and is displayed as plaintext (S2604). If the limitation is "mask private/detailed information", a corresponding part of the secure data converted into plaintext is masked (by painting such part by a pattern indicating masking or the like), and the masked data is displayed (S2608). Then, of the saved entries, processing limitation information of the edit processing is referred to (S2605). If the limitation is "inhibited", data to be processed is set in a read mode. The mode is changed by changing the attribute of a file which is open. Of course, this mode change is not permitted by the user. If the limitation is "permitted", the control directly enters the edit operation.

Figure 27:
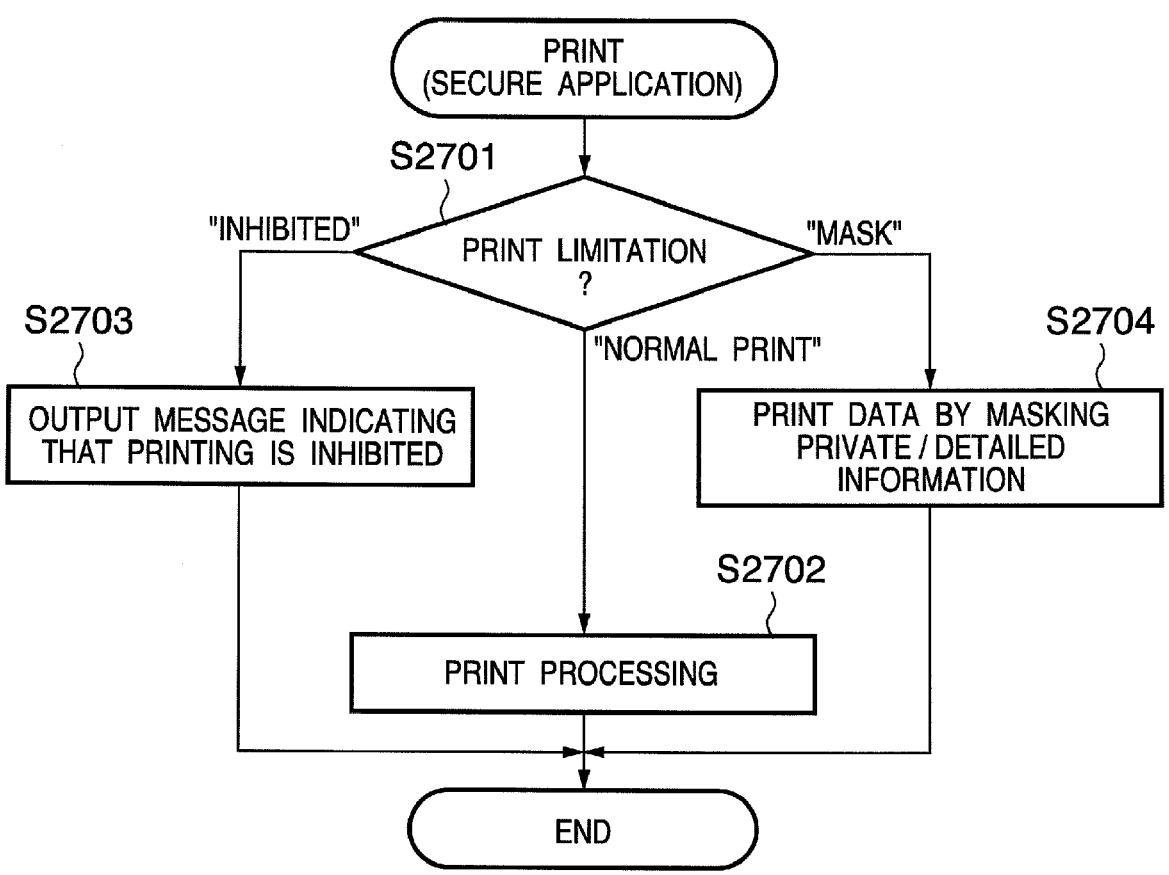
FIG. 27 is a flowchart showing a secure data print processing sequence by the secure application.

FIG. 27 is a flowchart showing an example of the sequence for printing a document (secure data) which is being inspected or edited. When the user inputs a "print" instruction on, e.g., the operation window of the secure application, processing limitation information of the print processing of entries of the security level-dependent processing limitation table saved in step S2602 in FIG. 26 is referred to (S2701). If the limitation is "inhibited", a message indicating that printing is inhibited is output (S2703). If the limitation is "normal print", the document is passed to the printer and is printed (S2604). If the limitation is "mask private/detailed information", a corresponding part of the secure data converted into plaintext is masked (by painting such part by a pattern indicating masking or the like) (S2704), and the masked data is passed to the printer and is printed.

The processing in FIG. 27 is applied, for example, when secure data is directly printed from the security management server 104.

According to the contents described in the first embodiment, processing limitations according to the security level can be designated for each secure data, and processing using secure data can be implemented while maintaining appropriately high security in various situations, especially, in a situation in which a file is brought out, in accordance with the security level held by the security module and that designated for each secure data.

In this way, the security level as one factor used to determine processing limitations on secure data can be automatically changed depending on an environment where the secure data exists. For this reason, appropriate processing limitations can be set in correspondence with a situation, and the balance between the convenience and security can be dynamically changed.

Second Embodiment

Figure 15:
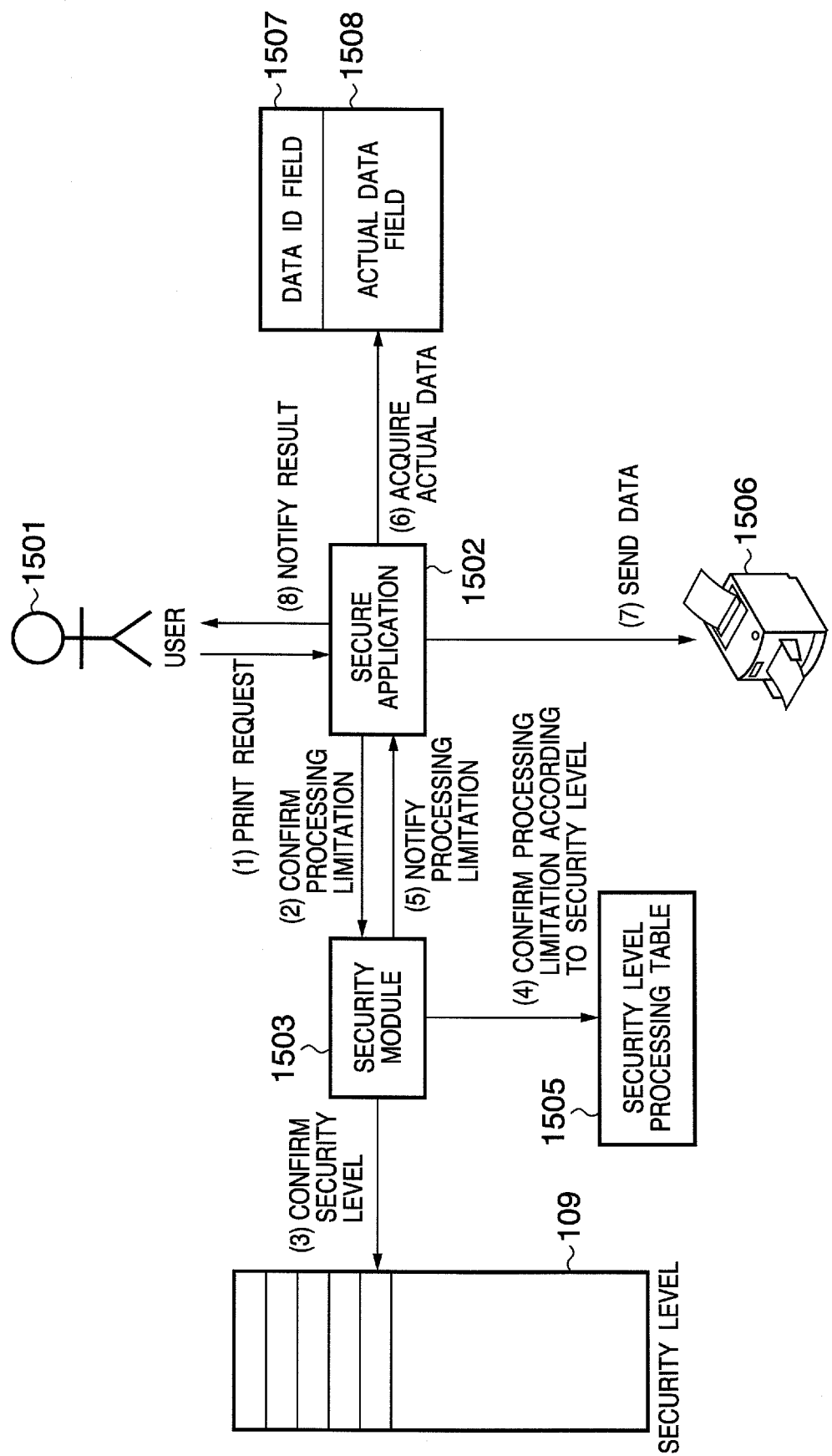
FIG. 15 is a view showing an example (modification example) of a processing limitation state in print processing based on a security level-dependent processing table appended to a security module.

In this embodiment, the security module holds the security level-dependent processing table. Hence, processing according to the security level need not be set for each secure data 102, and processing according to the identical security level can be applied to all secure data. The flow of processing when a security module 1503 has a security level-dependent processing table 1505 will be described below using FIG. 15. A user 1501 issues a print request of secure data 1507 which is being inspected using a secure application 1502. The secure application 1502 confirms processing limitations of the security module 1503. After the security module 1503 confirms a security level 109, the processing limitations are confirmed with reference to the security level-dependent processing table 1505 held by the security module 1503, and the processing limitations are returned to the security application 1502. The secure application 1502 acquires actual data 1508 from the secure data 1507, applies processing according to the processing limitations, and then transfers the secure data 1507 to a printer 1506. The secure application 1502 notifies the user of the processing result, and ends processing.

Figure 12A:
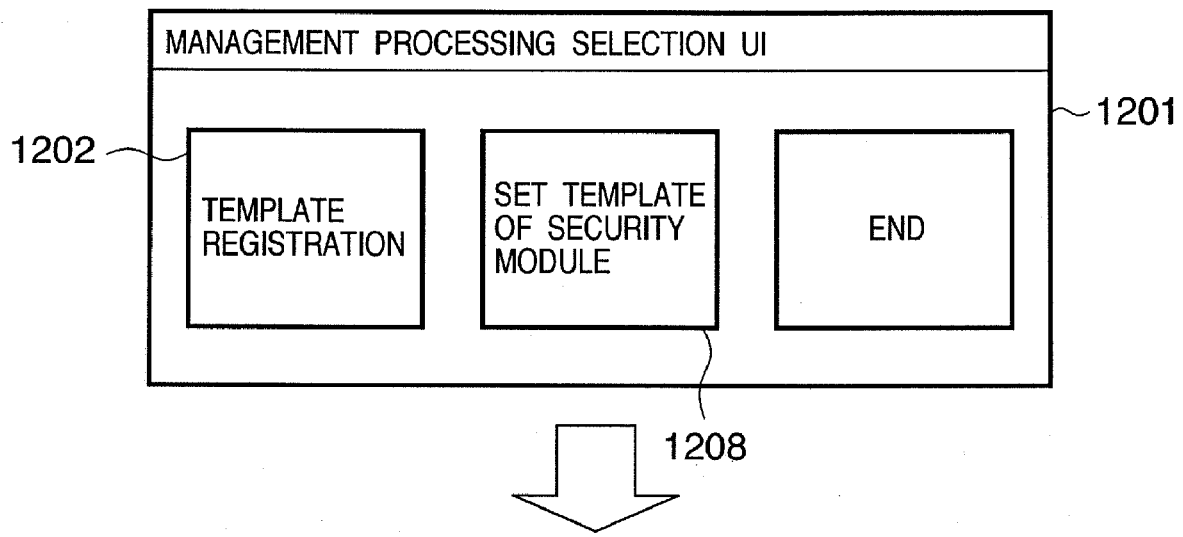

The security level-dependent processing table held by the security module 1503 is registered in the security server 104 by the user who has the management access right via the management processing selection UI 1201 shown in FIG. 12A. When the security module 1503 is installed in each device by an arbitrary installation program, the security level-dependent processing table is acquired from the security management server 104, and is installed in that device simultaneously with the security module 1503.

In this way, since the security module manages the security level-dependent processing table independent from the secure data, the security level-dependent processing table need not be acquired from the secure data, thus simplifying processing. Also, a data size to be managed as secure data can be reduced.

Third Embodiment

In this embodiment, a method of maintaining high security by installing the secure module 108 in the secure output device (e.g., printer) 105, even when the user sends secure data to a wrong secure output device 105 and prints it will be described. As shown in FIG. 16A, a security module 108 is installed in each of secure output devices 1602, 1603, and 1604. The security level may be determined by each security module according to the installation state like in the first embodiment. However, in this embodiment, a system administrator or the like gives fixed security level values in advance. Therefore, the secure output devices 1602 to 1604 do not undergo processing shown in FIG. 21. The security level of the secure output device is set to be lower as the device is installed at a highly public place. A print request from a host device 1601 is also appended with the access right of the user who issued the print result. In this way, when the user issues a print processing request to the secure output devices 1602, 1603, and 1604, even when the host device 1601 has a high security level, the processing limitations are imposed on the host device 1601 by the secure output devices 1602, 1603, and 1604. That is, upon reception of a print request including secure data, the security module of each secure output device specifies processing limitation information based on the access right of the user received together with the secure data, and the security level given to that secure output device. In this case, since the processing is "print", only one entry (processing limitation information) is specified with reference to the security level-dependent processing table included in the secure data based on the access right, security level, and processing contents (print). According to the processing limitation information, the secure output device imposes a limitation on the required output. The processing for imposing a limitation is the same as that in the sequence shown in FIG. 27.

Figure 16B:
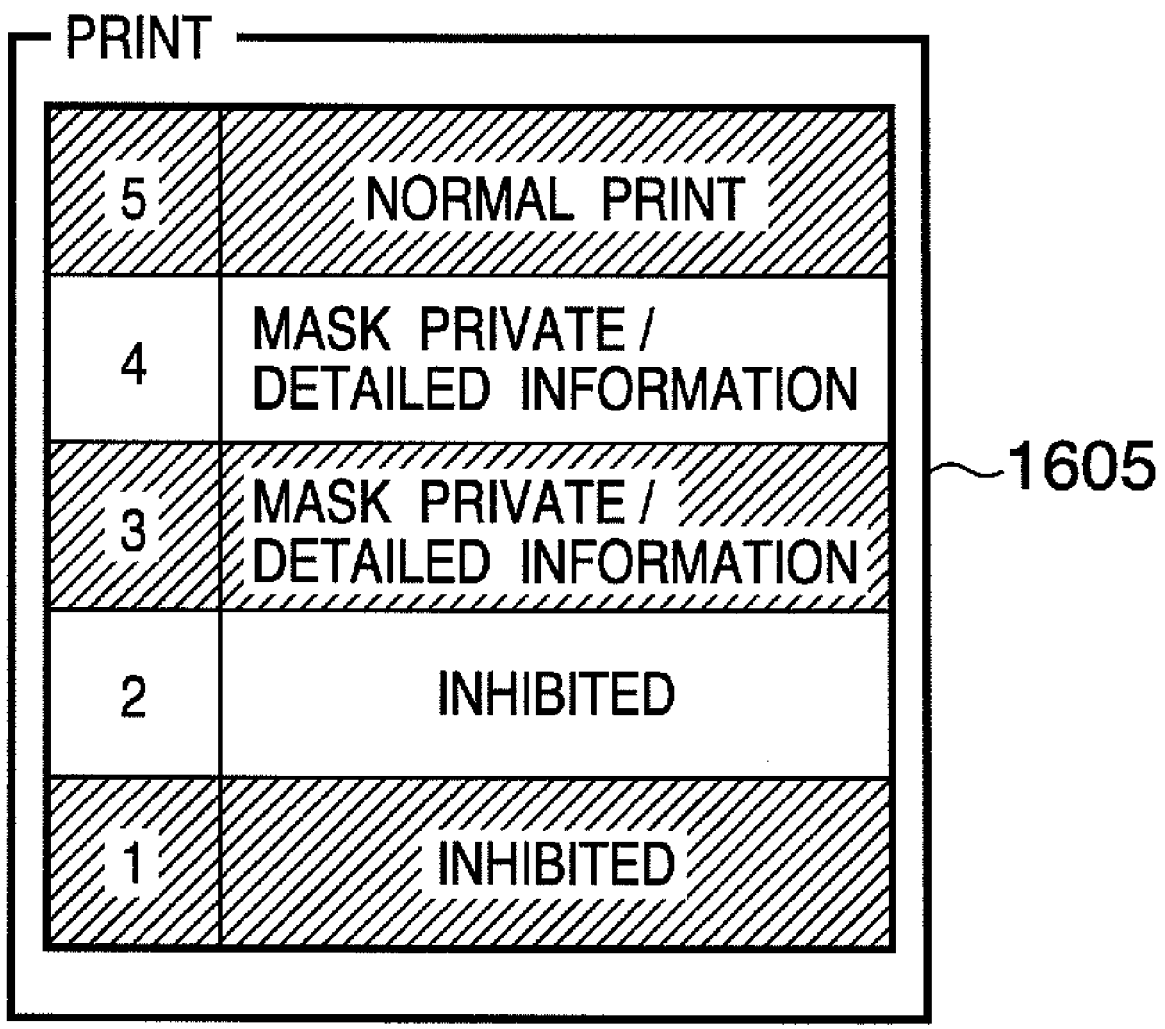

For example, assume that the print processing of secure data 102 is limited by a limitation defined by a security level-dependent processing table 1605 shown in FIG. 16B. In this case, since the host device has a high security level, it can send secure data 102 for normal print (Without any modification) to the secure output devices 1602, 1603, and 1604. This secure data is printed by the secure output device 1602 with a high security level as per normal. However, the secure data is not printed by the secure output device 1604 with a low security level since the print limitation of that device is "inhibited". As a result, the secure data 102 which is important in terms of security is not printed by the secure output device which is installed at a highly public place, thus maintaining high security.

When a processing limitation based on the security level is to be imposed for only the print processing, each secure output device may hold a security level-dependent processing table. In this case, even when the host device sends secure data 102 to the secure output devices 1602, 1603, and 1604 without any special processing of the secure data 102, the secure data undergoes adequate processing by an appropriate security output device and is printed. In this case, the host device does not perform any processing for implementing a limitation according to the security level. Alternatively, the host device performs processing to have security level "5". Also, only the security levels may be set in the secure output devices, and the host device may acquire the security level of the secure output device as a print destination and may send secure data to that secure output device after appropriate processing.

With this arrangement, even when the user does not consider the security of a printer, print processing is limited according to the security level of the printer used in the print processing.

Fourth Embodiment

Figure 17:
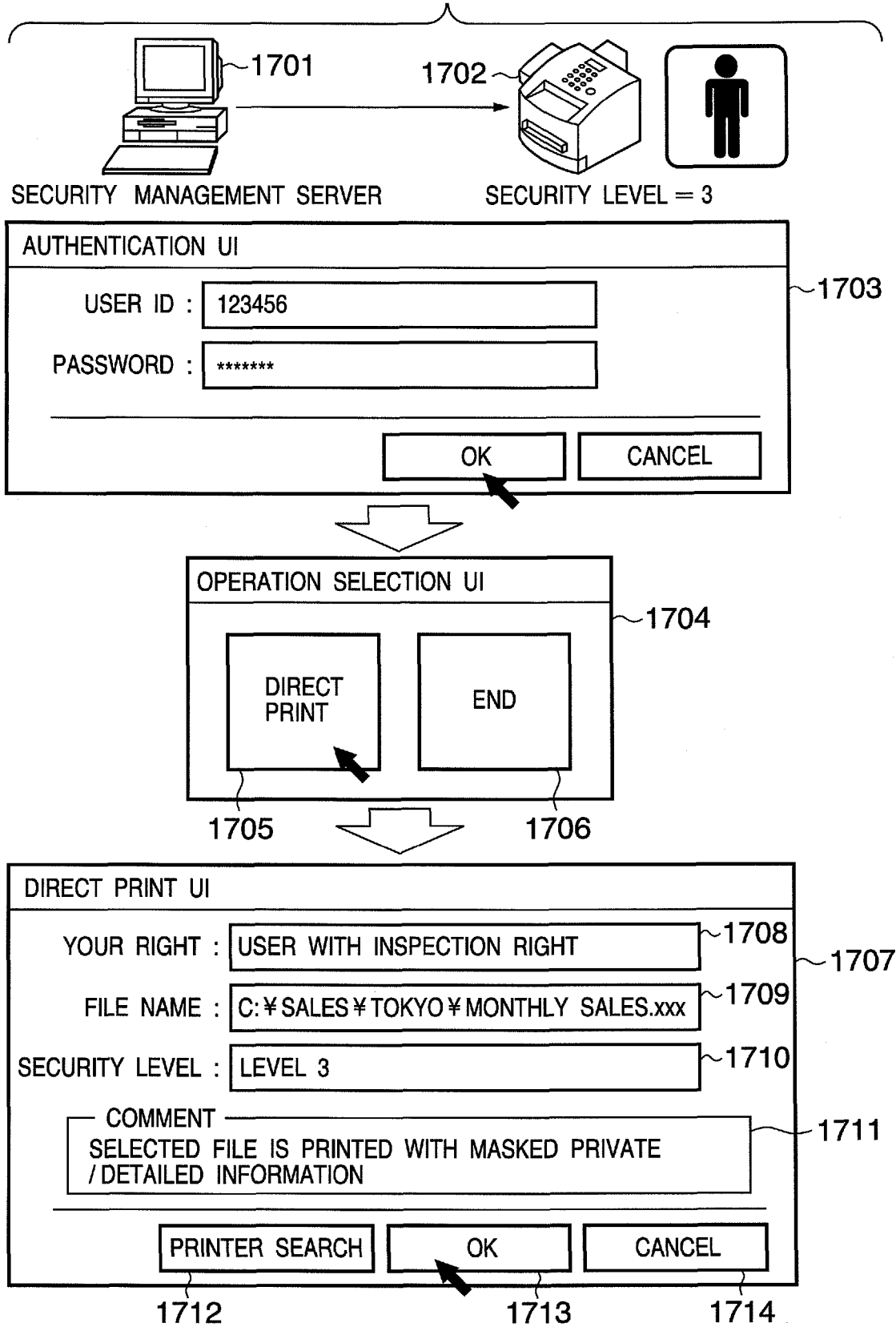
FIG. 17 is a view showing an example of a direct print state.
Figure 18A:
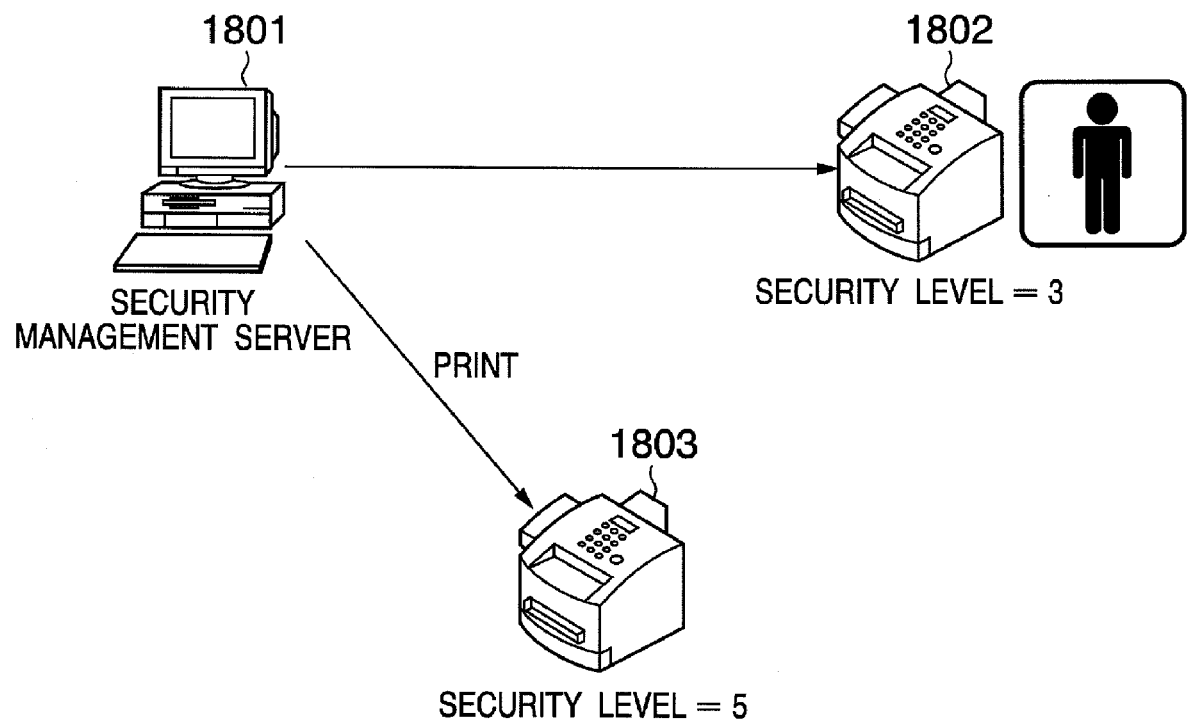

A method of imposing processing limitations according to the security level of the present invention upon directly issuing a print processing request from a security management server to a secure output device will be described below using FIGS. 17, 18A, and 18B. A security management server 1701 and secure output device 1702 are connected via a network or the like. The user can issue a print processing request of secure data managed by the secure management server 1701 to the secure output device 1702 using a user interface on the secure output device.

User authentication processing is done via an authentication UI 1703 displayed by a security module installed in the secure output device 1702. Upon completion of the authentication processing, a processing selection UI 1704 is displayed. When the user wants to directly send secure data from the secure management server 1701 to the secure output device 1702 and to execute print processing of that data, he or she presses a direct print button 1703. When the user wants to cancel processing and to end authentication, he or she presses an end button 1704. Upon pressing of the direct print button 1703, a direct print UI 1707 is displayed The direct print UI 1707 displays a user's access right field 1708, secure data file name selection field 1709, and security level field 1710 of the current secure output device. If the user selects the file name of secure data to be printed, the security module in the secure output device acquires the current security level of the secure output device and a security level management table that describes a processing limitation for each security level of the selected secure data from the security management server 1701, and displays a summary of the processing limitation in a comment field 1711.

The user presses a print execution button 1713 if he or she agrees with the contents displayed in the comment field 1711. The security module in the secure output device acquires a file designated by the secure data file name field 1709 from the security management server, and imposes a predetermined processing limitation according to the security level of the secure output device and the security level-dependent processing table of the secure data, thus executing print processing. When the user wants to cancel print processing, he or she presses a cancel button and the display returns to the processing selection UI 1704.

If the processing limitation displayed on the comment field 1711 does not meet the user's requirement, the user presses a printer search button 1712 to search for a printer which can execute print processing that meets the user's requirement. FIGS. 18A and 18B show that state. In this case, the user performs an operation using a UI window of a secure output device 1802. Secure data is arbitrarily designated by the user from a security management server 1801, and is transferred to and printed by a secure output device 1803 which is not operated by the user.

Upon pressing of the printer search button 1712, an output destination designation UI 1804 is displayed on the UI window on the secure output device 1802. The user enters required processing in a processing designation field 1805. A security module in the output device 1802 determines a required security level with reference to a security level-dependent processing table in the security data. Then, the security module searches for secure output devices which currently have the determined security level, and displays the found secure output devices (1806). The user selects an arbitrary one of the displayed secure output devices, and presses a print execution button 1807. In this way, the secure data is arbitrarily designated by the user from the security management server 1801, and is transferred to and printed by the secure output device 1803, which is not operated by the user. Note that security modules can communicate with each other, and can exchange each other's security level information.

With this arrangement, the security management server can detect processing limitations according to the security levels of secure printers to be used in print processing. For this reason, the security management server can select a printer as an output destination according to the processing limitation, and no test print processing is required.

Fifth Embodiment

Figure 19B:
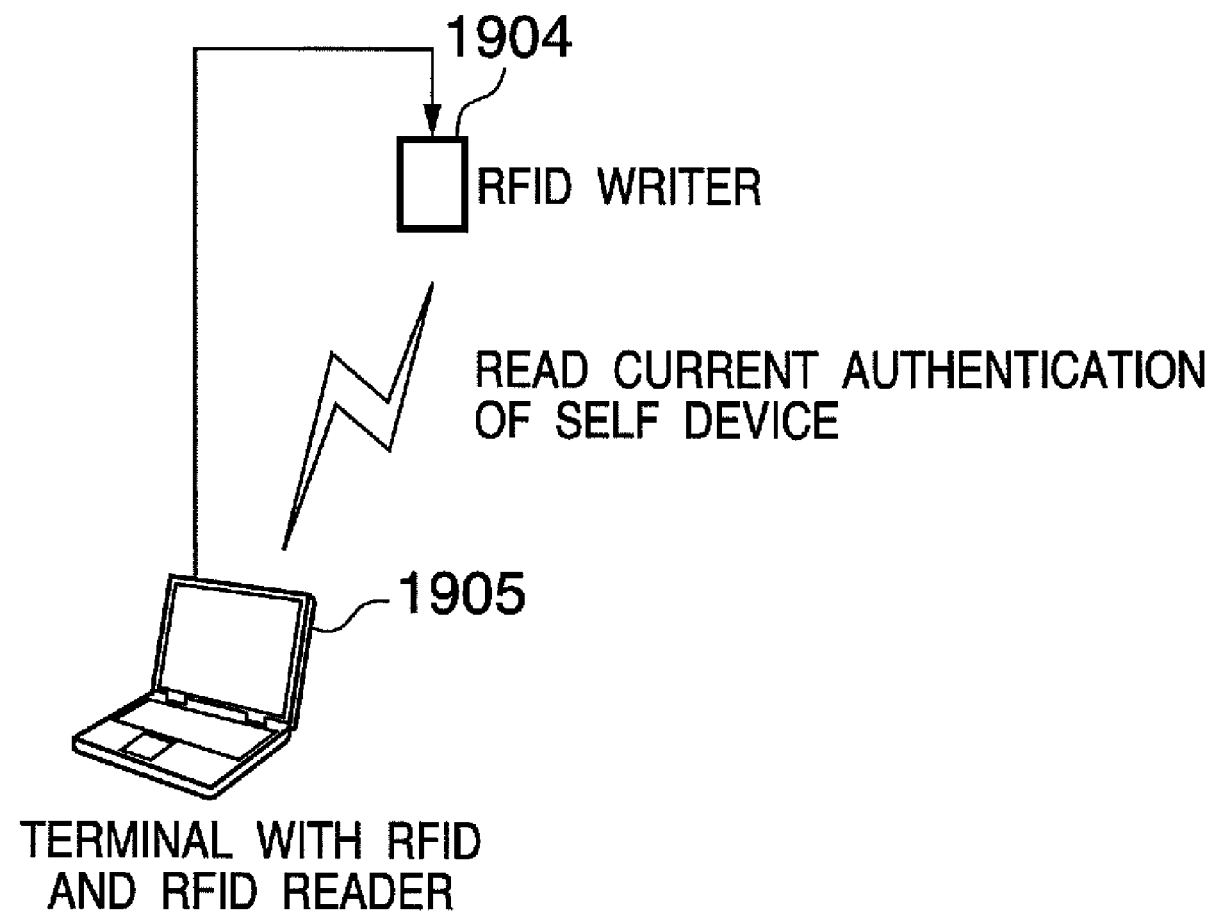

A current position specifying method using an RFID and a change in security level by appending temporary authentication data to the RFID will be described below using FIGS. 19A, 19B, 20A, 20B, and 20C. FIGS. 19A and 19B show the current position specifying method using an RFID. A portable host device 1905 with an RFID and RFID reader incorporates an RFID tag. When the portable host device 1905 is located in the vicinity of a security management server with an RFID writer, an entrance of a meeting room or living space equipped with an RFID writer, an entrance of a building or company, or passes it by, information indicating that fact or place is recorded in the RFID of the portable host device 1905 by a corresponding RFID writer 1901, 1902, or 1903. A security module installed in the portable host device 1905 acquires the written information via an RFID reader 1904 attached to the portable host device 1905, recognizes the current position of the portable host device 1905, and increases or decreases the security level. That is, the current position specified in step S2106 in FIG. 21 is specified based on the information written in this RFID.

Figure 20A:
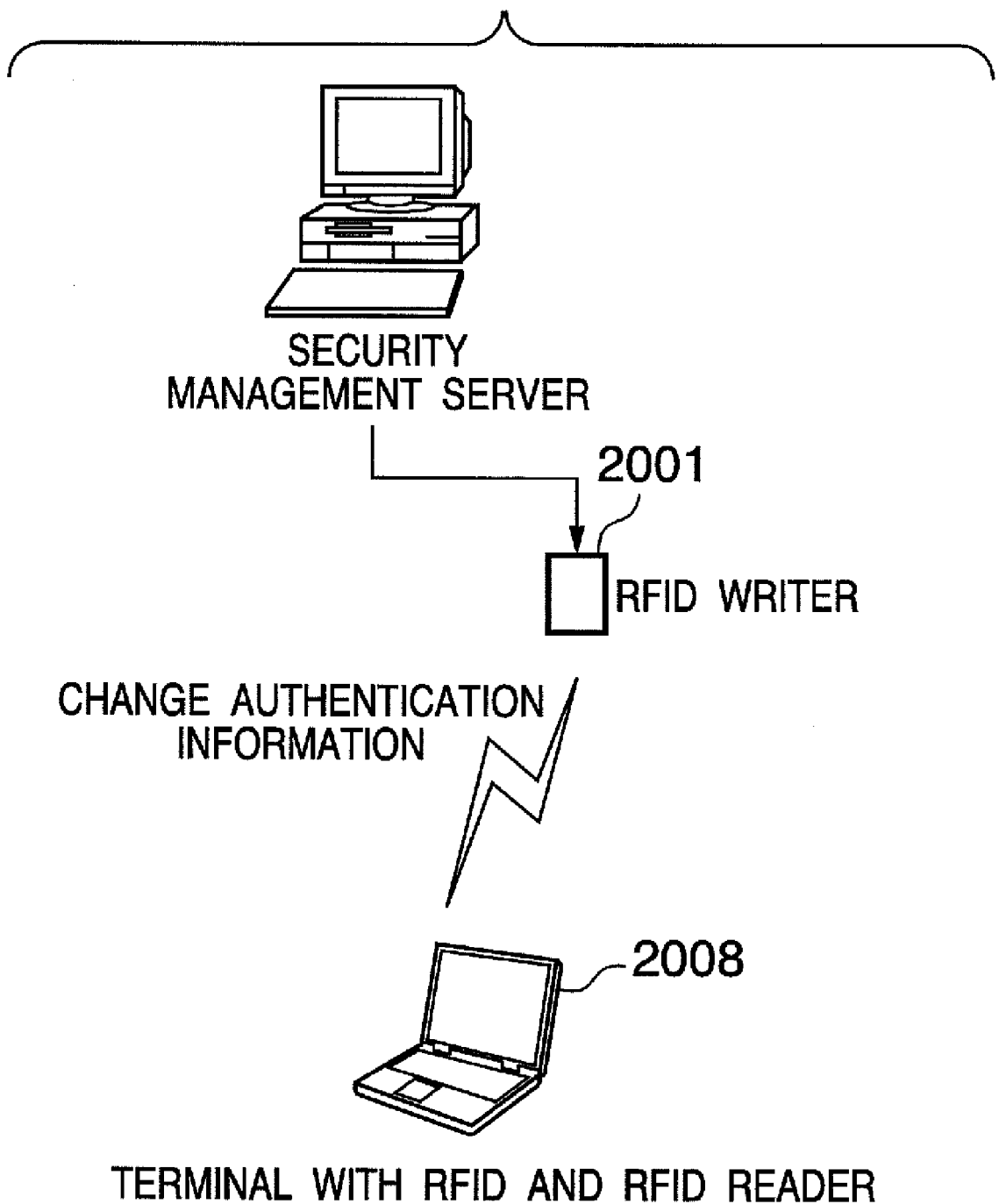
FIGS. 20A, 20B, and 20C are views showing an example of authentication based on the RFID.
Figure 20B:
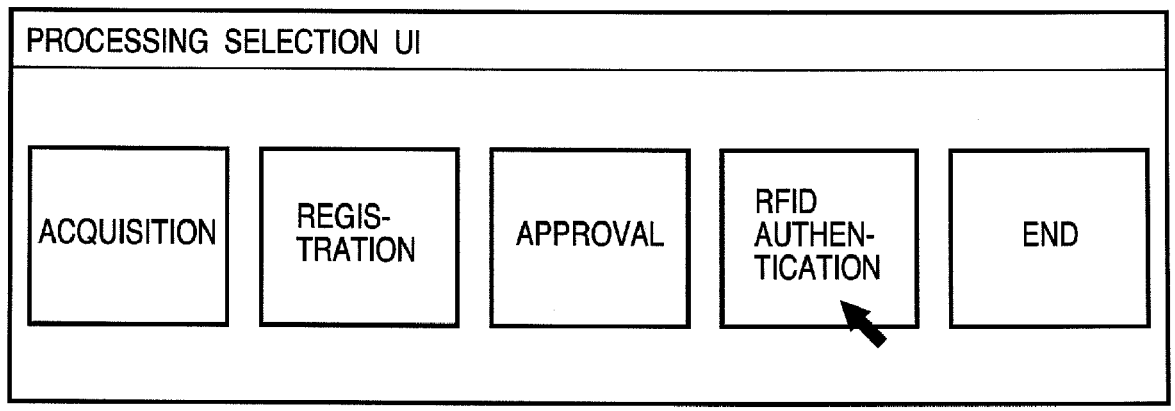
Figure 20C:
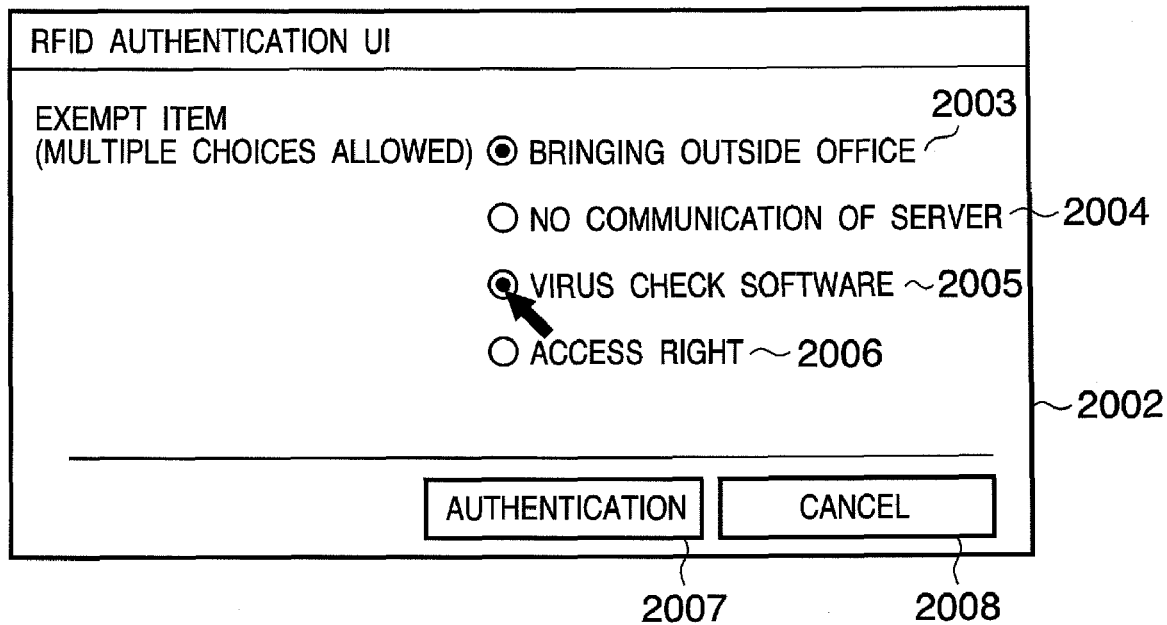

FIGS. 20A to 20C show an example of means for avoiding a security level drop by authenticating the RFID by predetermined authentication information from the security management server. A processing selection UI displayed by the security module includes an option of processing "RFID authentication" in this embodiment. The use who selected this option gets an exemption of an element that may decrease the security level via an RFID authentication UI 2002. In this way, the security module does not deduct any points associated with the exempted item. For example, radio buttons corresponding to bringing outside the office (2003), communication with the security management server (2004), installation of virus check software (2005), access right (2006), and the like can be set. When the user selects an exempt item and presses an authentication button 2007, information indicating exemption information is added to the RFID of a portable host device 2009 by an RFID writer 2001 appended to the security management server. If the user wants to cancel authentication, he or she presses a cancel button 2008. The authentication information may be stored in an external storage device such as a USB memory in place of the RFID.

Figure 29:
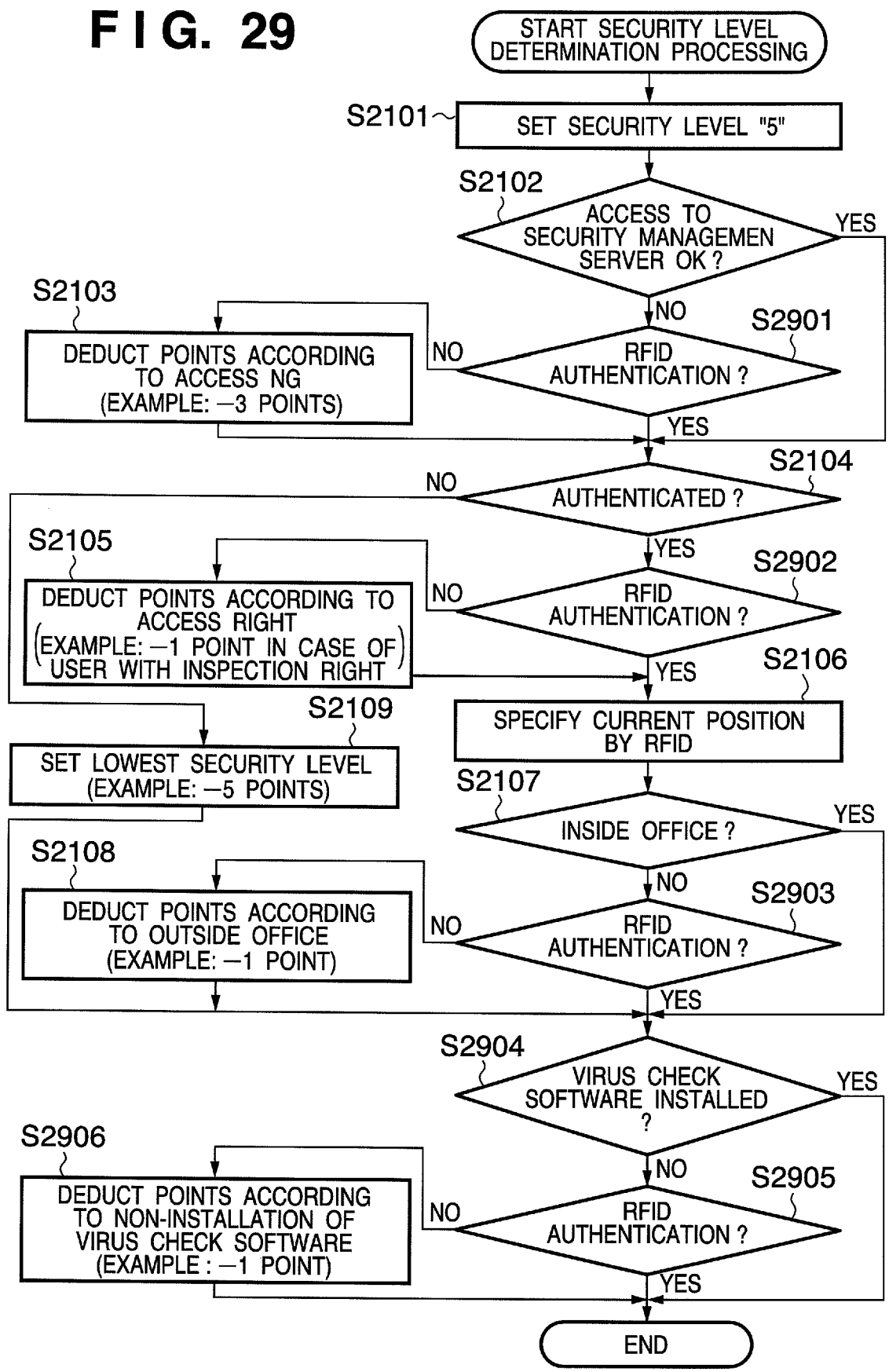
FIG. 29 is a flowchart showing a security level determination sequence according to the fifth embodiment.

FIG. 29 is a flowchart showing an example of the security level determination sequence by the security module in this embodiment. In this embodiment, FIG. 29 is used in place of FIG. 21 of the first embodiment. Note that the same reference numerals in FIG. 29 denote common steps to FIG. 21. The sequence in FIG. 29 may be executed by an interrupt in response to an input event that changes the security level or may be executed periodically. Put differently, the security level must be maintained in correspondence with the latest state.

The security level is stored at a predetermined location of a storage unit in a device on which the security module runs. At that storage location, "5" is stored as the security level (S2101). It is then checked if access to the security management server 104 is currently made (S2102). If access cannot be made, it is checked if the device of interest has undergone RFID authentication in terms of exemption of deducted points in case of access impossibility (no communication with the server) (S2901). If the device is not authenticated, a given value (e.g., 3) is deducted from the security level (S2103).

It is checked with reference to a user authentication flag if user authentication has succeeded (S2104). The user authentication flag is set to indicate the fact that user authentication by the security management server 104 has succeeded in the aforementioned sequence shown in FIG. 22 or the like. If authentication has succeeded, it is checked if the device of interest has undergone RFID authentication in terms of exemption of deducted points corresponding to the type of access right (S2902). If the device is not authenticated, the security level is decreased in accordance with the type of authentication, i.e., the obtained access right. For example, if the access right is "inspection", a predetermined value (e.g., 1) is deducted from the security level (S2105).

Furthermore, the current position is obtained based on the position information recorded in the RFID (S2106), and it is checked if that position falls within a predetermined range (e.g., in the office) (S2107). If the current position falls outside the predetermined range, it is checked if the device of interest has undergone RFID authentication in terms of exemption of deducted points when the device does not exist within the predetermined range (e.g., in the office) (S2903). If the device is not authenticated, a predetermined value (e.g., 1) is deducted from the security level according to the access right (S2108). On the other hand, if it is determined with reference to the authentication flag that authentication has failed, a lowest value is given as the security level (S2109).

It is checked if virus check software is installed in the device of interest (S2904). If no virus check software is installed, it is checked if the device of interest has undergone RFID authentication in terms of exemption of deducted points when no virus check software is installed (S2905). If the device is not authenticated, a given value is deducted from the security level (S2906).

In this way, a situation which wins acceptance about non-necessity of a decrease in security level can be excluded from point-deduction factors of the security level. As a result, an appropriate security level can be set for a device, and unnecessary processing limitations can be canceled.

[Modification]

In the fifth embodiment, authentication is made for exemption of deducted points for respective point deduction factors. Alternatively, the device may be authenticated simultaneously. In this case, after the security level is determined in the same manner as in FIG. 21, a given value (e.g., 3) is added to the security level if the device has undergone RFID authentication.

This application claims the benefit of Japanese Application No. 2005-064560, filed Mar. 8, 2005, which is hereby incorporated by reference herein in its entirety.

The invention claimed is:

1. A security management program which is recorded in a computer readable recording medium and is used to control access to target data in accordance with a security level of a device and an access right of a user, comprising:
- a code of a user authentication step of setting the access right of the user with reference to a saved user authentication history when access to an authentication server cannot be made;
- a code of a security level setting step of determining a security level of the device in accordance with a state of the device, and saving the determined security level; and
- a code of a prior authentication step of receiving authentication of a case in which the security level is not to decrease by the authentication server in advance, and saving information that specifies the case,
- wherein the security level setting step includes a step of decreasing the security level when access to the authentication server cannot be made in the user authentication step, when the access right cannot be set for the user, when the access right granted to the user is not more than a predetermined rank, or when the device does not exist within a predetermined range, and
- wherein the security level setting step includes a step of not decreasing the security level when a case in which the security level is to decrease corresponds to the case authenticated in the prior authentication step.

2. The program according to claim 1, further comprising a code of a data processing step of processing the data, and
- wherein the data processing step includes a step of processing the target data in correspondence with a processing limitation defined in advance according to the security level and the access right of the user for each target data, and
- the processing limitation is defined for at least one of inspection processing, edit processing, and print processing.

3. The program according to claim 2, wherein the processing limitation includes, for the inspection processing or the print processing, at least one of limitations defined in accordance with security levels as to (1) whether or not processing can be done for the entire target data, (2) whether or not a watermark is appended, (3) whether or not mask processing of private information and detailed information is executed, (4) whether or not processing can be done for a table of contents and topic, (5) whether or not a thumbnail can be displayed or printed, and (6) whether or not processing is inhibited.

4. The program according to claim 2, wherein the processing limitation includes, for the edit processing, a limitation defined as to whether processing is permitted or inhibited in accordance with security levels.

5. The program according to claim 1, wherein the data processing step includes a step of commonly imposing a processing limitation defined in advance in correspondence with the security level and the access right of the user to the target data by said security management program.

6. A security management apparatus for controlling access to target data in accordance with a security level of a device and an access right of a user, comprising:
- a user authentication unit which sets the access right of the user with reference to a saved user authentication history when access to an authentication server cannot be made;
- a security level setting unit which determines a security level of the device in accordance with a state of the device, and saves the determined security level; and
- a prior authentication unit that receives authentication of a case in which the security level is not to decrease by the authentication server in advance, and saving information that specifies the case,
- wherein the security level setting unit decreases the security level when access to the authentication server cannot be made by the user authentication unit, when the access right cannot be set for the user, when the access right granted to the user is not more than a predetermined rank, or when the device does not exist within a predetermined range, and
- wherein the security level setting unit does not decrease the security level when a case in which the security level is to decrease corresponds to the case authenticated by the prior authentication unit.

7. A security management method of controlling access to target data in accordance with a security level of a device and an access right of a user, comprising:
- a user authentication step of setting the access right of the user with reference to a saved user authentication history when access to an authentication server cannot be made;
- a security level setting step of determining a security level of the device in accordance with a state of the device, and saving the determined security level; and
- a prior authentication step of receiving authentication of a case in which the security level is not to decrease by the authentication server in advance, and saving information that specifies the case,
- wherein the security level setting step includes a step of decreasing the security level when access to the authentication server cannot be made in the user authentication step, when the access right cannot be set for the user, when the access right granted to the user is not more than a predetermined rank, or when the device does not exist within a predetermined range, and wherein the security level setting step includes a step of not decreasing the security level when a case in which the security level is to decrease corresponds to the case authenticated in the prior authentication step.

8. A secure print system which comprises:

a host computer which controls access to target data in accordance with a security level of a device and an access right of a user, and includes a user authentication unit which sets the access right of the user with reference to a saved user authentication history when access to an authentication server cannot be made, and a security level setting unit which determines a security level of the device in accordance with a state of the device, and saves the determined security level; and a printer which controls access to target data in accordance with a security level of a device and an access right of a user, and includes a user authentication unit which sets the access right of the user with reference to a saved user authentication history when access to an authentication server cannot be made, and a security level setting unit which determines a security level of the device in accordance with a state of the device, and saves the determined security level, wherein data is printed in accordance with a lower security level of the security level of said host computer and the security level of said printer.

* * * * *